United States Patent
Mosendz et al.

(10) Patent No.: US 9,443,545 B2
(45) Date of Patent: Sep. 13, 2016

(54) THERMALLY STABLE AU ALLOYS AS A HEAT DIFFUSION AND PLASMONIC UNDERLAYER FOR HEAT-ASSISTED MAGNETIC RECORDING (HAMR) MEDIA

(71) Applicant: HGST Netherlands B.V., Amsterdam (NL)

(72) Inventors: Oleksandr Mosendz, San Jose, CA (US); Vijay P. S. Rawat, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/140,408

(22) Filed: Dec. 24, 2013

(65) Prior Publication Data
US 2015/0179204 A1  Jun. 25, 2015

(51) Int. Cl.
G11B 5/73 (2006.01)
G11B 5/00 (2006.01)
G11B 5/60 (2006.01)
G11B 5/48 (2006.01)

(52) U.S. Cl.
CPC .......... *G11B 5/7325* (2013.01); *G11B 5/4866* (2013.01); *G11B 5/6088* (2013.01); *G11B 2005/0021* (2013.01); *G11B 2220/2508* (2013.01)

(58) Field of Classification Search
None
See application file for complete search history.

(56) References Cited

U.S. PATENT DOCUMENTS

| | | | |
|---|---|---|---|
| 5,981,017 A | 11/1999 | Agarwal et al. | |
| 7,235,750 B1 * | 6/2007 | Coutu et al. | 200/181 |
| 7,678,476 B2 | 3/2010 | Weller et al. | |
| 7,838,135 B2 | 11/2010 | Kuo et al. | |
| 7,862,914 B2 | 1/2011 | Kubota et al. | |
| 7,869,162 B2 | 1/2011 | Lu et al. | |
| 8,114,470 B2 | 2/2012 | Gao et al. | |
| 8,173,282 B1 | 5/2012 | Sun et al. | |
| 8,194,512 B2 | 6/2012 | Stipe | |
| 8,268,462 B2 | 9/2012 | Peng et al. | |
| 8,345,374 B2 | 1/2013 | Sendur et al. | |
| 8,399,051 B1 | 3/2013 | Hellwig et al. | |
| 8,451,707 B1 | 5/2013 | Stipe | |
| 8,460,805 B1 | 6/2013 | Gao et al. | |

(Continued)

FOREIGN PATENT DOCUMENTS

EP    1887568       2/2008
JP    2000332318 A  11/2000

(Continued)

OTHER PUBLICATIONS

Weller, D. et al., "A HAMR Media Technology Roadmap to an Areal Density of 4 Tb/in2," IEEE Transaction on Magnetics, vol. 50, No. 1, Jan. 2014, pp. 1-8.

(Continued)

*Primary Examiner* — Brian Butcher
(74) *Attorney, Agent, or Firm* — Zilka-Kotab, PC

(57) ABSTRACT

According to one embodiment, a magnetic medium includes a plasmonic underlayer having an Au alloy, where the Au alloy includes one or more alloying components that are substantially immiscible in Au; and a magnetic recording layer above the plasmonic underlayer. According to another embodiment, a magnetic medium, includes a multilayered plasmonic underlayer; and a magnetic recording layer above the multilayered plasmonic underlayer.

25 Claims, 14 Drawing Sheets

(56) References Cited

U.S. PATENT DOCUMENTS

| | | | |
|---|---|---|---|
| 8,507,114 | B2 | 8/2013 | Peng et al. |
| 8,509,039 | B1 | 8/2013 | Huang et al. |
| 8,530,065 | B1 | 9/2013 | Chernyshov et al. |
| 8,623,670 | B1 | 1/2014 | Mosendz et al. |
| 8,889,275 | B1 | 11/2014 | Yuan et al. |
| 8,945,733 | B2 | 2/2015 | Tanaka et al. |
| 9,224,411 | B1 | 12/2015 | Gao et al. |
| 9,324,353 | B2 | 4/2016 | Hellwig et al. |
| 2004/0081031 | A1* | 4/2004 | Saga et al. ............... 369/13.33 |
| 2005/0202287 | A1 | 9/2005 | Lu et al. |
| 2006/0154110 | A1 | 7/2006 | Hohlfeld et al. |
| 2006/0269794 | A1* | 11/2006 | Oikawa ..................... 428/831.2 |
| 2007/0253116 | A1* | 11/2007 | Takahashi ................. 360/313 |
| 2008/0026255 | A1 | 1/2008 | Das et al. |
| 2008/0090106 | A1* | 4/2008 | Braunstein et al. ........ 428/829 |
| 2010/0149676 | A1 | 6/2010 | Khizorev et al. |
| 2010/0182714 | A1 | 7/2010 | Kanbe et al. |
| 2010/0284104 | A1 | 11/2010 | Dieny et al. |
| 2010/0315735 | A1* | 12/2010 | Zhou et al. .................. 360/59 |
| 2011/0096431 | A1* | 4/2011 | Hellwig et al. .............. 360/59 |
| 2011/0116189 | A1* | 5/2011 | Sasaki ........................ 360/110 |
| 2011/0193097 | A1* | 8/2011 | Autry ............................. 257/77 |
| 2011/0235479 | A1 | 9/2011 | Kanbe et al. |
| 2012/0052330 | A1 | 3/2012 | Takekuma et al. |
| 2012/0113770 | A1 | 5/2012 | Stipe |
| 2012/0123525 | A1* | 5/2012 | Kramer-Brown et al. .. 623/1.34 |
| 2012/0225323 | A1 | 9/2012 | Nakai et al. |
| 2012/0225325 | A1 | 9/2012 | Nemoto et al. |
| 2012/0237791 | A1* | 9/2012 | Lin ............................... 428/634 |
| 2012/0251842 | A1 | 10/2012 | Yuan et al. |
| 2012/0251845 | A1 | 10/2012 | Wang et al. |
| 2012/0300600 | A1 | 11/2012 | Kanbe et al. |
| 2013/0004796 | A1 | 1/2013 | Peng et al. |
| 2013/0071695 | A1 | 3/2013 | Peng et al. |
| 2013/0201805 | A1 | 8/2013 | Seigler et al. |
| 2013/0270505 | A1* | 10/2013 | Dahmani ........................ 257/4 |
| 2014/0153128 | A1 | 6/2014 | Teguri et al. |
| 2014/0233363 | A1 | 8/2014 | Kryder et al. |
| 2014/0377590 | A1 | 12/2014 | Uchida |
| 2015/0138939 | A1 | 5/2015 | Hellwig et al. |
| 2016/0099017 | A1 | 4/2016 | Hellwig et al. |
| 2016/0118071 | A1 | 4/2016 | Hirotsune et al. |

FOREIGN PATENT DOCUMENTS

| | | | |
|---|---|---|---|
| JP | 2008034078 | A | 2/2008 |
| JP | 2008091024 | A | 4/2008 |
| JP | 2009064501 | A | 3/2009 |
| JP | 2010182386 | A | 8/2010 |
| JP | 2012048784 | A | 3/2012 |
| JP | 2012104212 | A | 5/2012 |
| WO | 2013044133 | | 3/2013 |
| WO | 2013140469 | A1 | 9/2013 |

OTHER PUBLICATIONS

Kryder, M. et al., "Heat Assisted Magnetic Recording," Proceedings of the IEEE, vol. 96, No. 11, Nov. 2008, pp. 1810-1835.

Challener, W.A. et al., "Heat-assisted magnetic recording by a near-field transducer with efficient optical energy transfer," Nature Photonics, vol. 3, Apr. 2009, pp. 220-224.

Schuller, J.A. et al., "Plasmonics for extreme light concentration and manipulation," Nature Materials, vol. 9, Mar. 2010, pp. 193-204.

Mosendz, O. et al., "Ultra-high coercivity small-grain FePt media for thermally assisted recording," Journal of Applied Physics 111, 07B729, 2012, pp. 07B729-1-07B729-4.

Weller, D. et al., "L10 FePtX—Y media for heat-assisted magnetic recording," Phys. Status Solidi A, 210, No. 7, Wiley-VCH Verlag GmbH & Co., 2013, pp. 1245-1260.

Varaprasad, B. et al., "L10 ordered FePt based perpendicular recording media for heat assisted magnetic recording heat assisted magnetic recording," IEEE Transactions on Magnetics, vol. 49, Issue 2, 2013, pp. 718-722.

Pisana, S. et al., "Effects of grain microstructure on magnetic properties in FePtAg—C media for heat assisted recording," Journal of Applied Physics, 113, 043910, 2013, pp. 043910-1-043910-6.

Hellwig at al., U.S. Appl. No. 14/084,535, filed Nov. 19, 2013.

Hirotsune et al., U.S. Appl. No. 14/522,554, filed Oct. 23, 2014.

Hellwig at al., U.S. Appl. No. 14/505,440, filed Oct. 2, 2014.

Granz et al., "Granular L10 FePl:X (X=Ag, B, C, SiOx, TaOx) thin films for heat assisted magnetic recording," The European Physical Journal B, vol. 86, No. 81, 2013, pp. 1-7.

Pan et al., "Heat-assisted magnetic recording," Nature Photonics, vol. 3, Apr. 2009, pp. 189-190.

Lim et al., "Interfacial Effects of MgO Buffer Layer on Perpendicular Anisotropy of L 10 FePt Films," IEEE Transactions on Magnetics, vol. 42, No. 10, Oct. 2006, pp. 3017-3019.

Statement of Relevance of JP2008091024, 1 page.

Non-Final Office Action from U.S Appl. No. 14/084,535, dated Jul. 27, 2015.

Notice of Allowance from U.S. Appl. No. 14/084,535, dated Dec. 16, 2015.

Office Action from Japanese Application No. 2014-258951, dated Dec. 18, 2015.

Statement of Relevance of Non-Translated Foreign Document for JP2010182386.

Non-Final Office Action from U.S Appl. No. 14/522,554, dated Mar. 10, 2016.

Corrected Notice of Allowance from U.S. Appl. No. 14/084,535, dated Feb. 5, 2016.

Non-Final Office Action from U.S. Appl. No. 14/505,440, dated May 5, 2016.

* cited by examiner

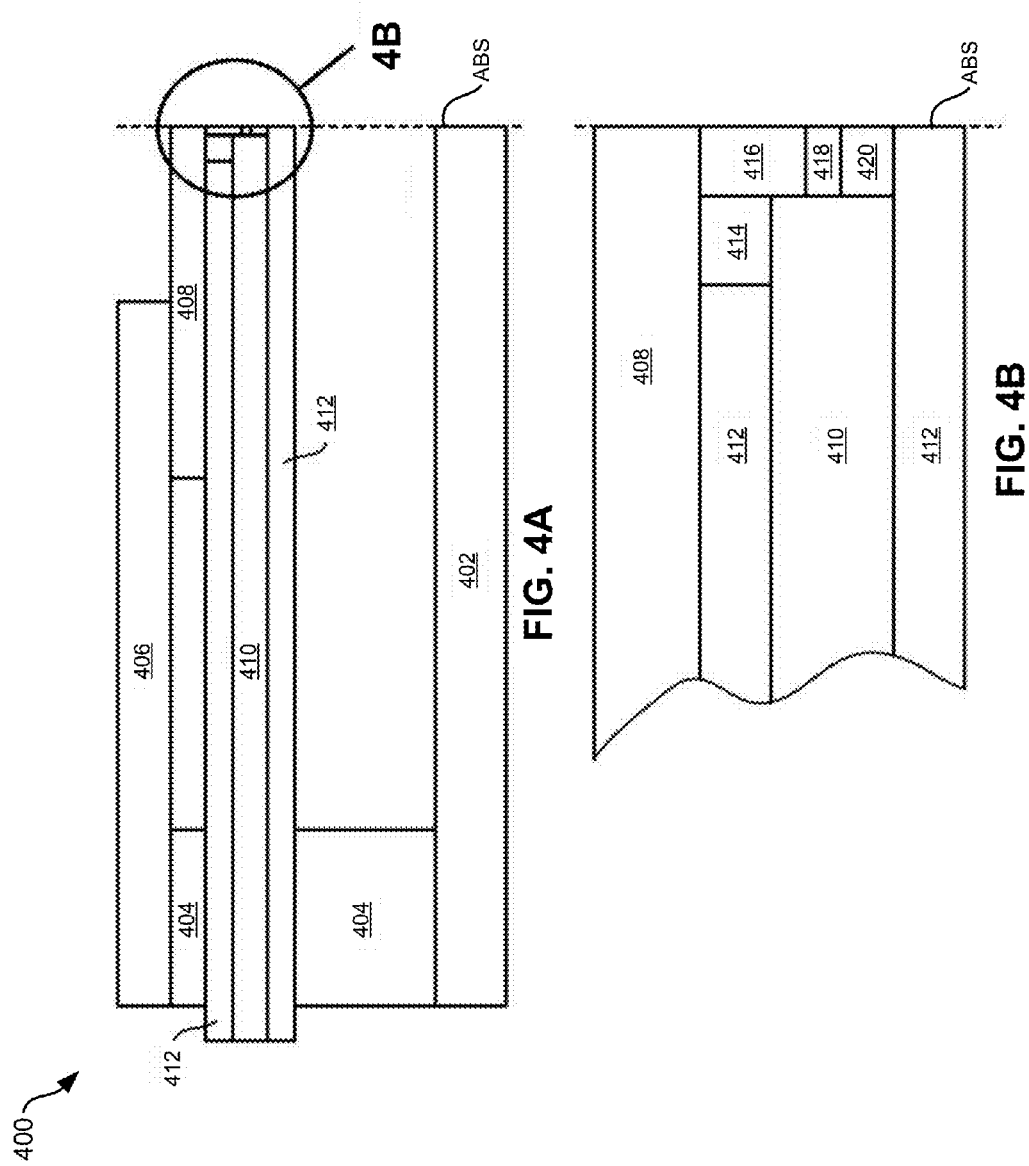

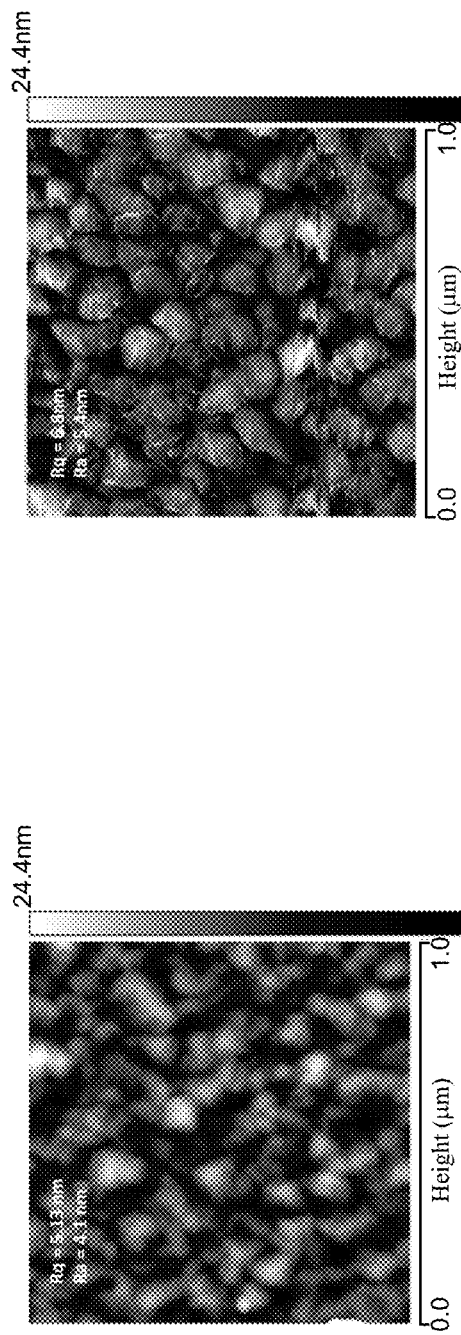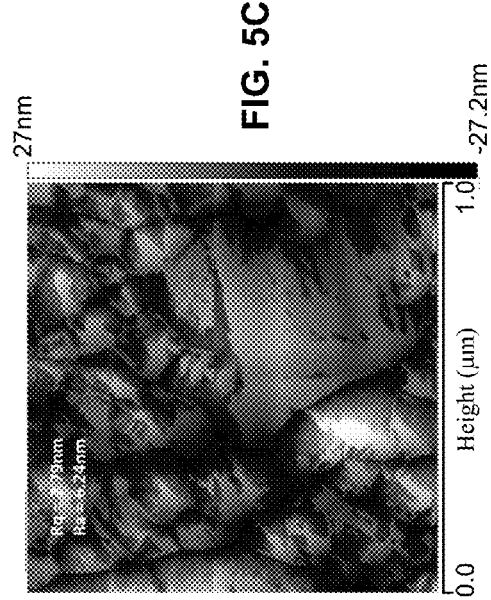
FIG. 5A
FIG. 5B
FIG. 5C

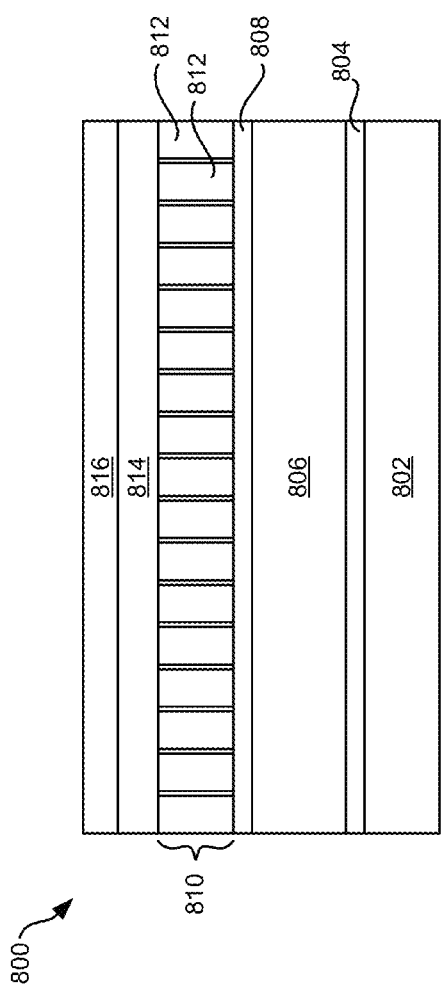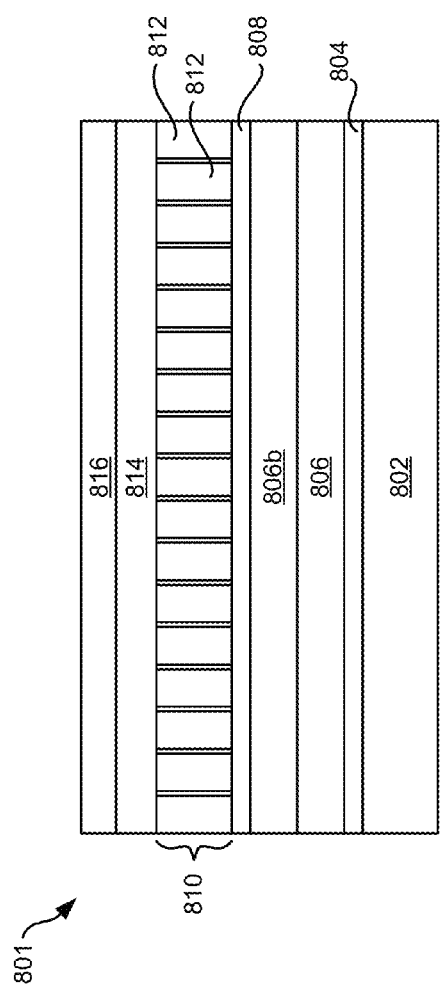

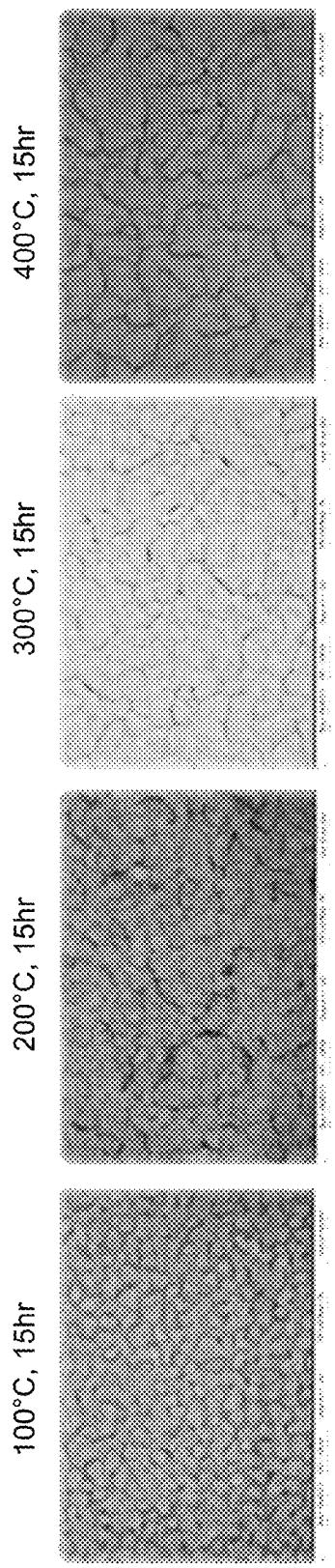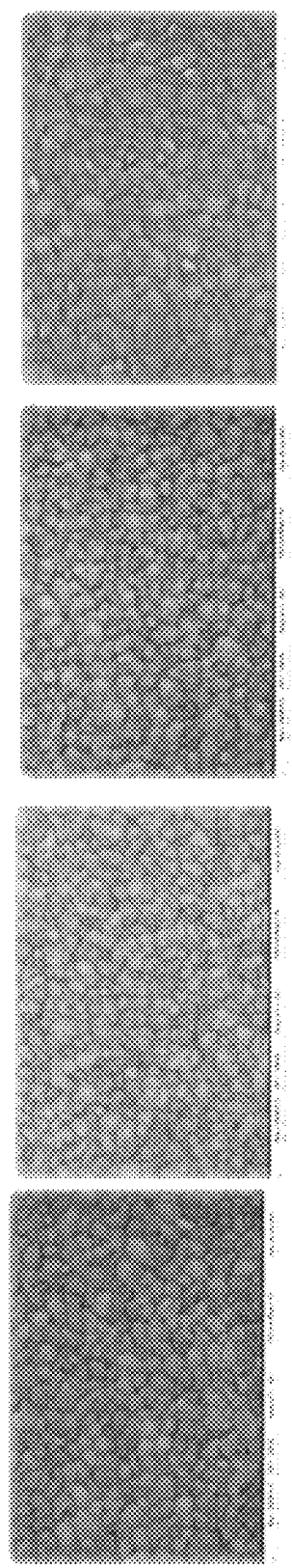

US 9,443,545 B2

THERMALLY STABLE AU ALLOYS AS A HEAT DIFFUSION AND PLASMONIC UNDERLAYER FOR HEAT-ASSISTED MAGNETIC RECORDING (HAMR) MEDIA

FIELD OF THE INVENTION

The present invention relates to data storage systems, and more particularly, this invention relates to thermally stable gold (Au) alloys as a heat diffuser and plasmonic underlayer in heat-assisted magnetic recording (HAMR) media.

BACKGROUND

The heart of a computer is a magnetic hard disk drive (HDD) which typically includes a rotating magnetic disk, a slider with read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

However, the further miniaturization of the various components, particularly, the size and/or pitch of magnetic grains, presents its own set of challenges and obstacles in conventional HDD products. Noise performance and spatial resolution are key parameters in magnetic recording media and are ongoing challenges to advance the achievable areal density of media. The dominant media noise source today is transition jitter. In sputtered media, it reflects the finite size, random positioning and dispersions in size, orientation and magnetic properties of the fine grains that comprise the media.

In order to address grain size and transition jitter it was proposed to change the recording mechanism from conventional magnetic field recording to heat assisted magnetic recording (HAMR), also known as "thermally assisted magnetic recording" TAR or TAMR. HAMR recording employs heat to lower the effective coercivity of a localized region on the magnetic media surface and write data within this heated region. The data state becomes stored, or "fixed," upon cooling the media to ambient temperatures. HAMR techniques can be applied to longitudinal and/or perpendicular recording systems, although the highest density state of the art storage systems are more likely to be perpendicular recording systems. Heating of the media surface has been accomplished by a number of techniques such as focused laser beams or near field optical sources.

Thermal management is an important factor in HAMR recording. For example, high operating temperatures can lead to serious damage to HAMR heads. Moreover, while the magnetic media needs to be heated to high temperatures (e.g. at least 100K above Tc) during the writing process, the media also needs to be cooled quickly in order to avoid thermal destabilization of the written information. However, faster cooling rates may require more heating power to achieve the desired temperatures.

Conventional heat sink layers are thus typically used in HAMR media to conduct or direct heat away from the recording layer after writing in order to limit thermal erasure. However, conventional heat sink layers may conduct heat both vertically and laterally, thereby resulting in possible lateral thermal spreading during the writing process, which may limit track density and the size of the data bits. Moreover, conventional metallic materials with high thermal conductivity such as pure Cu, Ag, Al, etc. are often too soft and mobile, and therefore do not possess sufficient mechanical durability or a surface roughness acceptable for HDD technology.

A need therefore exists for magnetic media that can be used in heat assisted magnetic recording systems that provide a suitable thermal design for heat confinement and management in the media.

SUMMARY

According to one embodiment, a magnetic medium includes a plasmonic underlayer having an Au alloy, where the Au alloy includes one or more alloying components that are substantially immiscible in Au; and a magnetic recording layer above the plasmonic underlayer.

According to another embodiment, a magnetic medium, includes a multilayered plasmonic underlayer; and a magnetic recording layer above the multilayered plasmonic underlayer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4A is a partial cross section view of a thin film perpendicular write head design according to one embodiment.

FIG. 4B is a partial cross section expanded view of detail 4B in FIG. 4A, in accordance with one embodiment.

FIG. 5A is an atomic force microscope (AFM) scam of an Ag alloy having >95 at % Ag after deposition.

FIG. 5B is an AFM scan of an Ag alloy having >95 at % Ag after 1 minute of annealing at 300° C. in dry air.

FIG. 5C is an AFM scan of an Ag alloy having >95 at % Ag after 1 minute of annealing at 400° C. in dry air.

FIG. 8A is a partial cross-sectional view of a magnetic medium according to one embodiment.

FIG. 8B is a partial cross-sectional view of a magnetic medium according to one embodiment.

FIG. 10A is a scanning electron microscope (SEM) image of an ion-beam deposited Au film after 15 hours of annealing at 100° C. in dry air.

FIG. 10B is a SEM image of an ion-beam deposited Au film after 15 hours of annealing at 200° C. in dry air.

FIG. 10C is a SEM image of an ion-beam deposited Au film after 15 hours of annealing at 300° C. in dry air.

FIG. 10D is a SEM image of an ion-beam deposited Au film after 15 hours of annealing at 400° C. in dry air.

FIG. 11A is a SEM image of a sputtered Au—Rh film having 1.75 at % Rh after 15 hours of annealing at 100° C. in dry air.

FIG. 11B is a SEM image of a sputtered Au—Rh film having 1.75 at % Rh after 15 hours of annealing at 200° C. in dry air.

FIG. 11C is a SEM image of a sputtered Au—Rh film having 1.75 at % Rh after 15 hours of annealing at 300° C. in dry air.

FIG. 11D is a SEM image of a sputtered Au—Rh film having 1.75 at % Rh after 15 hours of annealing at 400° C. in dry air.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

The following description discloses several preferred embodiments of disk-based storage systems and/or related systems and methods, as well as operation and/or component parts thereof.

In one general embodiment, a magnetic medium includes a plasmonic underlayer having an Au alloy, where the Au alloy includes one or more alloying components that are substantially immiscible in Au; and a magnetic recording layer above the plasmonic underlayer.

In another general embodiment, a magnetic medium, includes a multilayered plasmonic underlayer; and a magnetic recording layer above the multilayered plasmonic underlayer.

Figure 1:
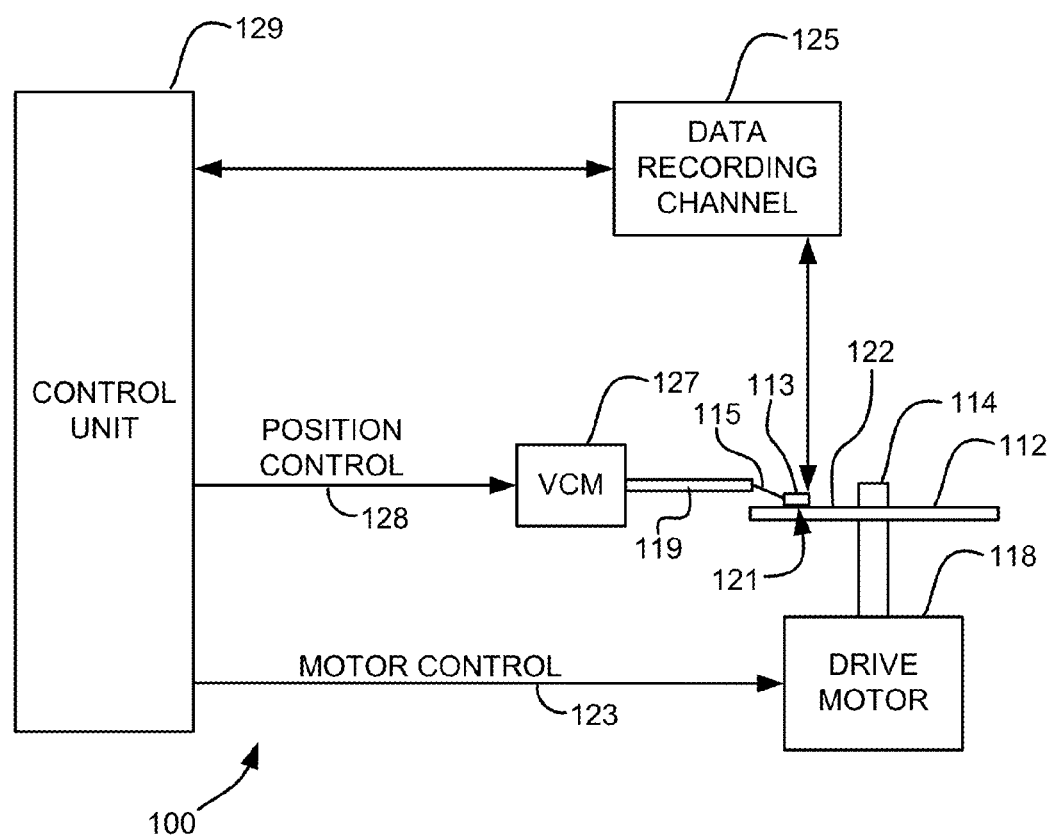
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
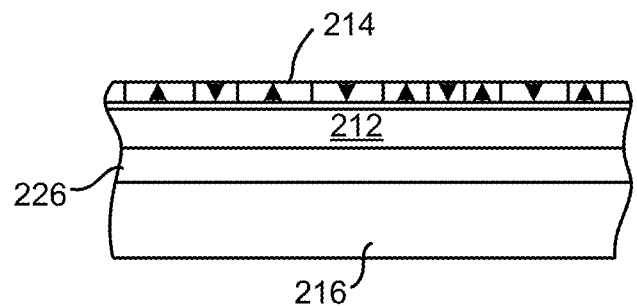
FIG. 2A is a magnetic recording medium utilizing a perpendicular HAMR recording format.

FIG. 2A illustrates a schematic diagram of a HAMR recording medium usable with magnetic disc recording systems, such as that shown in FIG. 1, according to one embodiment. This medium is utilized for recording magnetic impulses substantially perpendicular to the surface of a recording medium. For such perpendicular recording, the medium typically includes an underlayer 212 of a material having a high magnetic permeability. This underlayer 212 is then provided with an overlying coating 214 of HAMR-type magnetic material preferably having a high coercivity relative to the under layer 212.

As discussed above, heat assisted magnetic recording (HAMR) employs heat to lower the effective coercivity of a localized region on the magnetic media surface and to write data within this heated region. For instance, HAMR involves directing electromagnetic radiation (e.g. visible, infrared, ultraviolet etc.) onto a surface of a magnetic medium to raise the temperature of a localized area of the medium to facilitate switching of the magnetization of the area. The achievable recording density is related to the size of this heated region on the magnetic medium. After the writing phase, it is important that the heated region of the medium cools quickly to prevent thermal fluctuations from disturbing the written data.

Given that media magnetic anisotropy is a function of temperature, HAMR recording media thus requires a well-controlled thermal profile in order to achieve high track density. It is particularly desirable for HAMR media to have a high thermal gradient. In other words, it is desirable for the temperature of the HAMR media to have a large gradient (e.g. a change per unit distance) in both a lateral direction (e.g. in the plane of the media) and a vertical direction (perpendicular to the plane of the media). Accordingly, in some approaches, HAMR media may comprise a heat sink layer to conduct or direct heat away from the recording layer after writing in order to limit thermal erasure. See, e.g., the heat sink layer 226 of FIG. 2A. However, conventional heat sink layers may conduct heat both vertically and laterally. Employing such conventional heat sink layers may therefore result in the HAMR media exhibiting lateral thermal spreading during the writing process, which may limit track density and the size of the data bits.

Figure 2B:
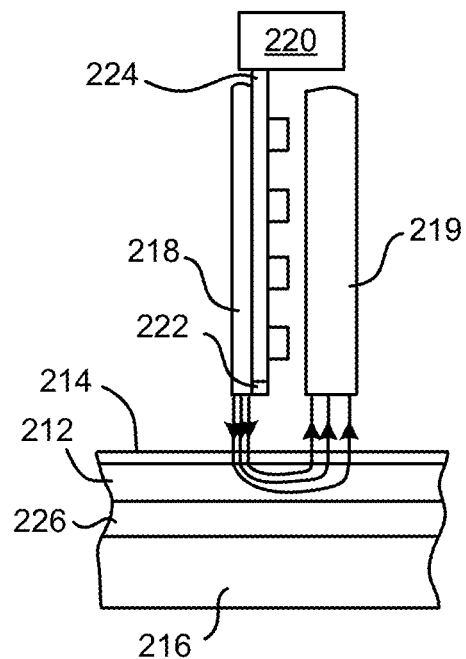
FIG. 2B is a schematic representation of a HAMR recording head and recording medium combination for perpendicular HAMR recording on one side.

Referring now to FIG. 2B, the operative relationship between a HAMR head 218 and a recording medium is shown according to one embodiment. The recording medium illustrated in FIG. 2B includes the high permeability underlayer 212, the overlying coating 214 of magnetic material, and the heat sink layer 226, described with respect to FIG. 2A above. However, these layers 212, 214, and 226 are shown applied to a suitable substrate 216. Typically there is also an additional layer (not shown) called an "exchange-break" layer or "interlayer" between layers 212 and 214.

A heating mechanism of any known type heats layer 214 to lower the effective coercivity of a localized region on the magnetic media surface in the vicinity of the write pole 218 of the head. In the structure shown, a light source 220 such as a laser illuminates a near field transducer 222 of known type via a waveguide 224. See FIG. 4A for a description of an illustrative heating mechanism. Referring again to FIG. 2B, the magnetic lines of flux extending between the write pole 218 and return pole 219 of the head loop into and out of the overlying coating 214 of the recording medium with the high permeability underlayer 212 of the recording medium causing the lines of flux to pass through the overlying coating 214 in a direction generally perpendicular to the surface of the medium to record information in the overlying coating 214 of magnetic material preferably having a high coercivity relative to the underlayer 212 in the form of magnetic impulses having their axes of magnetization substantially perpendicular to the surface of the medium. The flux is channeled by the soft underlying coating 212 back to the return pole 219 of the head.

In some approaches, a HAMR recording medium, such as those disclosed herein, may not have a soft underlayer present in the media stack, in which case, the flux lines will be confined within the media layer 214 and run parallel to the surface of the media.

Figure 3A:
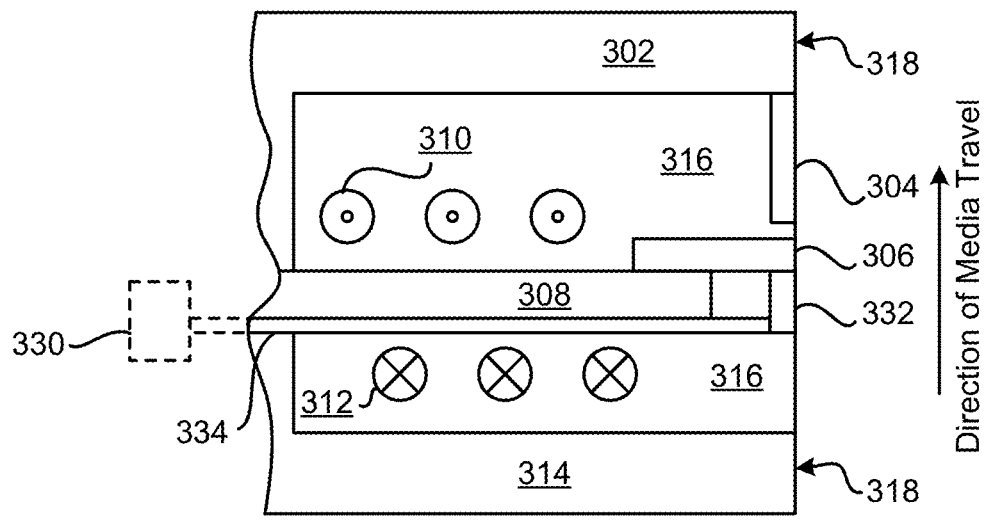
FIG. 3A is a cross-sectional view of one particular embodiment of a perpendicular magnetic head with helical coils.

Referring now to FIG. 3A, a cross-sectional view of a perpendicular magnetic head is shown according to one embodiment. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

A heating mechanism of any known type is provided to heat the medium for HAMR. In the structure shown, a light source 330 such as a laser illuminates a near field transducer 332 of known type via a waveguide 334.

Perpendicular writing is achieved by forcing flux through the stitch pole 308 into the main pole 306 and then to the surface of the disk positioned towards the ABS 318.

Figure 3B:
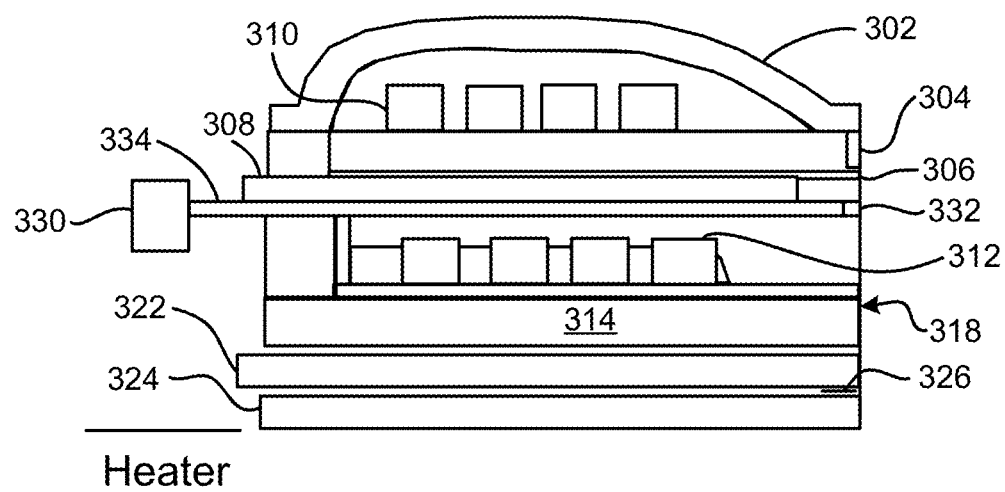
FIG. 3B is a cross-sectional view of one particular embodiment of a piggyback magnetic head with helical coils.

FIG. 3B illustrates a piggyback magnetic head having similar features to the head of FIG. 3A, including the heating mechanism. Two shields 304, 314 flank the stitch pole 308 and main pole 306. Also sensor shields 322, 324 are shown. The sensor 326 is typically positioned between the sensor shields 322, 324.

In FIG. 3B, an optional heater is shown near the non-ABS side of the magnetic head. A heater (Heater) may also be included in the magnetic heads shown in FIG. 3A. The position of this heater may vary based on design parameters such as where the protrusion is desired, coefficients of thermal expansion of the surrounding layers, etc.

Referring now to FIG. 4A, a partial cross section view of a system 400 having a thin film perpendicular write head design incorporating an integrated aperture near field optical source (e.g., for HAMR operation) is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 4A, the write head has a lower return pole layer 402, back-gap layer(s) 404, upper return pole layer 406, and upper pole tip layer 408. In one approach, the lower return pole layer 402 may also have a lower pole tip (not shown) at the ABS. Layer 410 is an optical waveguide core, which may be used while conducting HAMR, e.g., to guide light from a light source to heat a medium (not shown) at the ABS when the system 400 is writing thereto. According to a preferred approach, the optical waveguide core is surrounded by cladding layers 412. Moreover, layers 410 and 412 may extend through at least a portion of back-gap layer(s) 404. The components inside of Circle 4B are shown in an expanded view in FIG. 4B, as discussed in further detail below.

Layer 410 may be comprised of a suitable light transmitting material, as would be known by one of reasonable skill in the relevant art. Exemplary materials include $Ta_2O_5$, and/or $TiO_2$. As shown, the core layer 410 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 404, lower return pole 402, and/or upper bounding layers 406, 408, and 412 as would be recognized by those of skill in the art. Layers 402, 404, 406, and 408 may be comprised of a suitable magnetic alloy or material, as would be known by one of reasonable skill in the relevant art. Exemplary materials include Co, Fe, Ni, Cr and combinations thereof.

As described above, FIG. 4B is a partial cross section expanded view of detail 4B in FIG. 4A, in accordance with one embodiment. Pole lip 416 is magnetically coupled to upper pole tip layer 408, and to optional magnetic step layer 414. Aperture 418 (also known as a ridge aperture), surrounding metal layer 420, and pole lip 416 comprise the near field aperture optical source (or near field transducer), which is supplied optical energy via optical waveguide core 410. Pole lip 416 and optional magnetic step layer 414 may be comprised of a suitable magnetic alloy, such as Co, Fe, Ni, Cr and/or combinations thereof. Metal layer 420 may be comprised of Cu, Au, Ag, and/or alloys thereof, etc.

With continued reference to FIG. 4B, cladding layer 412 thickness may be nominally about 300 nm, but may be thicker or thinner depending on the dimensions of other layers in the structure. Optional magnetic step layer 414 may have a nominal thickness (the dimension between layers 408 and 410) of about 300 nm, and a nominal depth (as measured from layer 416 to layer 412) of about 180 nm. Pole lip 416 may have a nominal depth (as measured from the ABS) approximately equal to that of layer 420, with the value being determined by the performance and properties of the near field optical source (see examples below). The thickness of the pole lip 416 can vary from about 150 nm (with the optional magnetic step layer 414) to about 1 micron, preferably between about 250 nm and about 350 nm. The thickness of optical waveguide core layer 410 may be nominally between about 200 nm and about 400 nm, sufficient to cover the thickness of the aperture 418. In the structure shown in FIG. 4B, the layer 408 extends to the ABS. In some preferred embodiments, the layer 408 may be recessed from the ABS while maintaining magnetic coupling with the layers 414 and 416.

Except as otherwise described herein, the various components of the structures of FIGS. 3A-4B may be of conventional materials and design, as would be understood by one skilled in the art.

As mentioned previously, thermal management is an important factor for HAMR heads, as high operating temperatures in HAMR heads can lead to serious damage thereto. Thus, various embodiments described and/or suggested herein preferably include an improved heat sink design which may reduce the peak temperature of HAMR head during a data writing operation. As a result, the NFT peak temperature can effectively be reduced, thereby improving head reliability significantly in such embodiments. Moreover, approaches described and/or suggested herein may also allow for a narrower main pole lip in addition to a wider step, thereby improving performance of the system.

Thermal management is also an important factor for the HAMR recoding media, as media magnetic anisotropy is a function of temperature. Accordingly, the high thermal conductivity of the improved heat sinks described herein, can induce an anisotropic heat transfer in the media layer where the lateral heat transfer is minimized, thereby improving the thermal gradient in the media layer. The increased thermal gradient will lead to sharp transition between the magnetic bits that are being written and the neighboring downtrack bit, resulting in an improved areal density.

Various embodiments described and/or suggested herein may therefore include an improved heat sink design comprising a plasmonic underlayer. A plasmonic underlayer may comprise a plurality of metal nanostructures which support surface plasmons (oscillation of the conduction electrons at the nanoparticle surface) that result in extraordinary optical properties that are not exhibited by any other class of material. For example, exposure of the metal nanostructure to the oscillating electromagnetic field of the incident radiation typically induces a collective coherent oscillation of the free electrons (conduction band electrons) of the metal. The amplitude of the oscillation of the free electrons reaches a maximum at a specific frequency, the surface plasmon resonance (SPR). Due to the SPR oscillation, the absorption of the incident radiation by the metal nanostructures is strongly enhanced. Accordingly, the presence of a plasmonic underlayer may limit the lateral spread of the incident radiation (e.g. the evanescent wave from the NFT). Moreover, as the strongly absorbed light may be converted to heat via nonradiative processes, the presence of a plasmonic underlayer may also allow the HAMR media to reach the desired temperature with a smaller thermal spot, thereby resulting in a higher effective temperature gradient in the HAMR media. The inclusion of a plasmonic underlayer is thus advantageous for recording density in the HAMR media, as it may allow for increased track and pitch density of HAMR recording. It is important to note, however, that a plasmonic underlayer is not limited to metals and may be formed from non-metallic materials, as well.

Materials for use in a heat sink layer and/or a plasmonic layer may include: Ta, Ti, Cr, Fe, Cu, Ag, Pt and Au, in various approaches. The bulk thermal and electrical conductivities of these materials are summarized in Table 1.

TABLE 1

|    | Thermal Conductivity (W/m-K) | Electrical Conductivity ($\sigma$) at 20° C. ($10^7$ S/m) |
|----|------------------------------|-----------------------------------------------------------|
| Ta | 57.7                         | 0.83                                                      |
| Ti | 22.3                         | 0.25                                                      |
| Cr | 93.9                         | 0.8                                                       |
| Fe | 80.4                         | 1.04                                                      |
| Cu | 401                          | 5.89                                                      |
| Ag | 429                          | 6.30                                                      |
| Pt | 71.6                         | 0.944                                                     |
| Au | 318                          | 4.52                                                      |

The bulk thermal and electrical conductivity values listed in Table 1 are higher than what is typically achievable in sputtered films having an appropriate thickness of less than 100 nm, for use in HAMR media. Transition metals such as Ta, Ti, Cr, are not suitable materials for heat sinks as their bulk thermal conductivity is lower than 100 W/m-K. Furthermore, metals such as Ag and Au have high thermal conductivity and optimal plasmonic properties for HAMR application but are typically soft and show grain growths at moderate temperatures (e.g. >150° C.). This makes pure metals such as Ag and Au unacceptable for HDD technology.

Thus, one approach involves producing a heat sink layer and/or plasmonic underlayer including silver alloys, Ag—$X_i$, where $X_i$ is an alloying component selected from the group consisting of: Au, Cu, Pd, and Nd, and combinations thereof. The alloying component, X, may be present in the silver alloy in an amount greater than zero and less than 1 at %, according to some embodiments. Such silver alloys may exhibit high thermal conductivity, e.g. from 100 to 250 W/m-K, low electrical resistivity, e.g. from 2-10 uohm-cm, and a surface roughness of less than 1 nm. However, silver alloys with even a dilute amount of the alloying component exhibit aggressive grain growth at the high temperatures generally encountered during fabrication of the HAMR media deposition process, and are therefore not thermally stable during HAMR magnetic layer deposition.

FIGS. 5A-5C provide atomic force microscope (AFM) scans illustrating such grain growth in an Ag alloy having >95 at % Ag. FIG. 5A illustrates the Ag alloy as deposited, with an average surface roughness (Ra) and root mean square surface roughness (Rq) of 4.1 nm and 5.13 nm, respectively. As used herein, Ra refers to the mean deviation in surface heights; specifically the arithmetic mean of the absolute values of the height of the surface profile. As also used herein, Rq refers to the root mean square deviation of the surface heights; specifically the root mean square average of the absolute values of the height of the surface profile.

As is typical of Ag—$X_i$ alloys, exposure of the Ag alloy to increasing temperatures, yields segregation of the alloying components at grain boundaries, thereby resulting in an overall increase in the surface roughness (Ra) and root mean square roughness (Rq) in the Ag alloy. For instance, after annealing an Ag alloy having >95 at % Ag for 1 minute at 300° C., the Ra and Rq values for the Ag alloy are increased to 5.4 nm and 6.8 nm, respectively, as shown in FIG. 5B. Likewise, after annealing an Ag alloy having >95 at % Ag for 1 minute at 400° C., the Ra and Rq values for the Ag alloy are increased to 6.24 nm and 7.79 nm, respectively, as shown in FIG. 5C.

Figure 7:
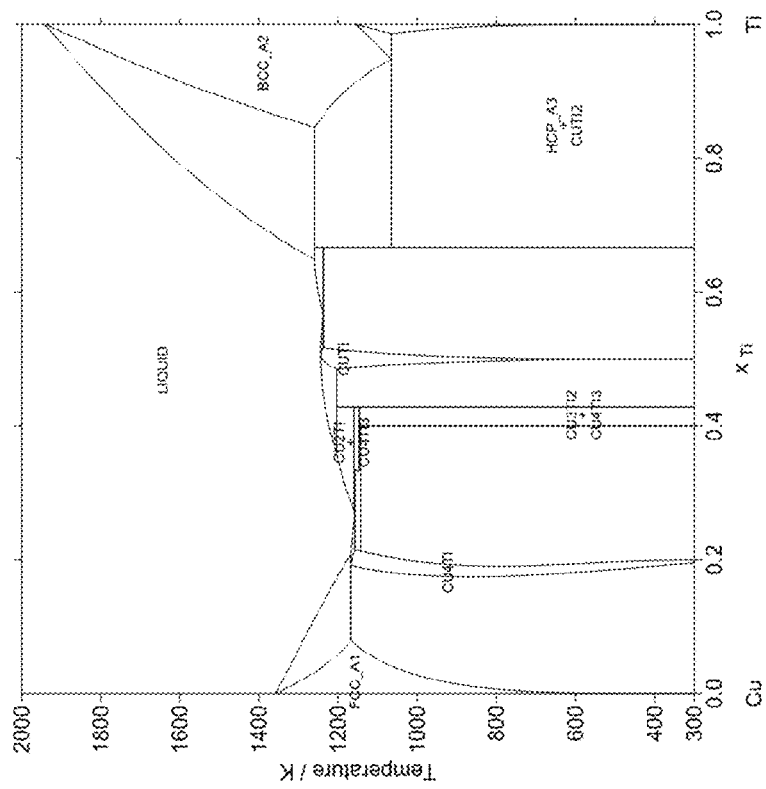
FIG. 7 is a Cu—Ti binary phase diagram, illustrating expected precipitation of Cu—Ti secondary phases at high temperatures.
Figure 6:
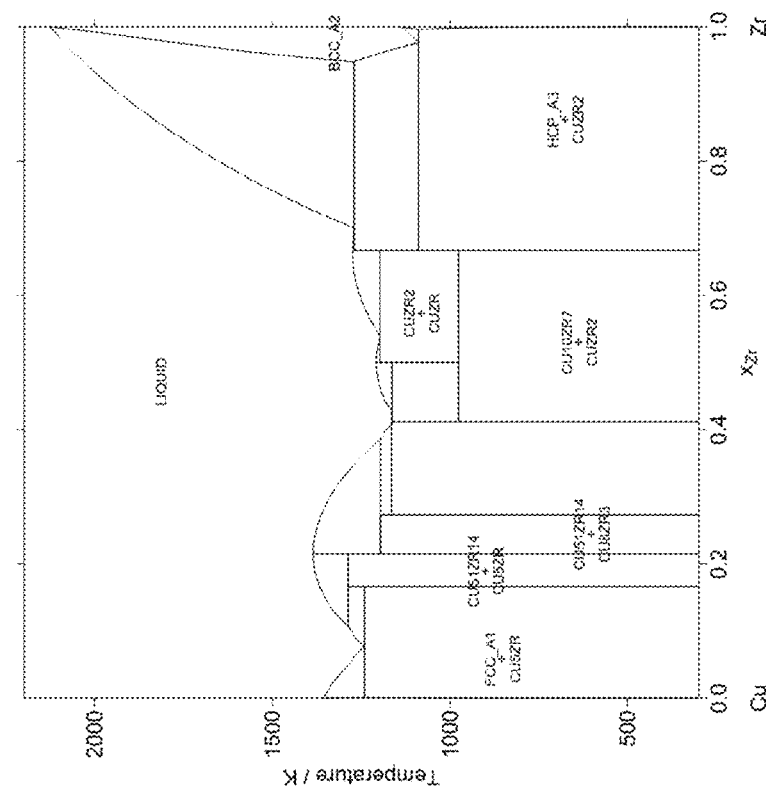
FIG. 6 is Cu—Zr binary phase diagram, illustrating expected precipitation of Cu—Zr secondary phases at high temperatures.

In another approach, a heat sink layer and/or plasmonic under layer may comprise copper alloys, Cu—$X_{ii}$, where $X_{ii}$ is an alloying component selected from the group consisting of Zr, Ti, Ta, and combinations thereof. The alloying component, $X_{ii}$, may be present the copper alloy in an amount greater than zero and less than 5 at %, according to some embodiments. Such copper alloys may exhibit high thermal conductivity (e.g. from 100 to 300 W/m-K for copper alloys with <0.5 at % Zr) and a surface roughness of less than 1 nm. However, such copper alloys are also not stable at the high temperatures associated with HAMR. In particular, the copper alloys may exhibit segregation of the alloying components at such high temperatures (e.g. temperatures≥about 300° C.). Typical process temperatures for HAMR media deposition are 400-700° C., and thus underlying $CuX_{ii}$ films would not be stable during magnetic layer deposition. For example, reference to the phase diagrams for CuZr (FIG. 6) and CuTi (FIG. 7), indicates the presence of multiple secondary phases (e.g. Cu5Zr, Cu8Zr3, Cu10Zr7, and CuZr2 phases in case of Cu—Zr binary metal system and Cu4Ti, Cu4Ti2, Cu4Ti3, CuTi and CuTi2 phases in case of Cu—Ti binary metal system). Precipitation of CuZr and CuTi secondary phases is expected with annealing at temperatures greater than 300° C. and such precipitation will lead to a decrease in thermal conductivity of the alloy material, thereby, reducing the usefulness of Cu—Zr or Cu—Ti alloys as a plasmonic underlayer for HAMR media.

Embodiments described herein overcome the aforementioned drawbacks by providing a plasmonic underlayer for use in HAMR media that also exhibits thermal properties superior to conventional heat sink layers. In preferred approaches, the plasmonic underlayers disclosed herein include gold alloys (Au—X), where X may be an alloying component substantially immiscible in Au. It is important to note that the alloying component X may include one or more elements, one or more metals, one or more compounds, etc. For example, in one particular embodiment, X may include one or more immiscible metals selected from a group consisting of: Rh, Ni, W, Co, Pt, Ru, B, Mo, and a combination thereof.

The Au—X alloys disclosed herein may exhibit a high electrical conductivity, as well as a high thermal conductivity in various approaches. For example, a plasmonic underlayer comprising the Au—X alloys disclosed herein may exhibit a thermal conductivity of at least 30 W/m-k, in some approaches. In more approaches, a plasmonic underlayer comprising Au—X may exhibit a thermal conductivity that is about 2 to 3 times higher than the thermal conductivity of an otherwise identical underlayer comprising transition metals (e.g. Ta, V, Zr, or Cr).

The Au—X alloys disclosed herein are advantageous in that they not only exhibit high electrical and thermal conductivities, but are also morphologically stable at high temperatures, e.g. temperatures about 300° C. As noted previously, the disclosed Au—X alloys comprise the immiscible alloying component X in preferred approaches. Immiscible materials typically coexist in separate phases/layers/regions, and do not exhibit morphological stability at higher temperatures. Moreover, gold alloys with a miscible alloying component, such as Au—Ta alloys, also do not exhibit the morphological stability at high temperatures. However, it has been surprisingly and unexpectedly found that for the Au—X alloys disclosed herein, the immiscible alloying component X surrounds the gold grain boundaries. Thus, in preferred approaches where the immiscible alloying component X has a melting point that is greater than the melting point of gold and surrounds the gold grain boundaries, the immiscible alloying component X appears to effectively "lock" the gold grains in place, thereby preventing grain growth at increasing temperatures.

By way of example only, consider an Au—W alloy. In general, at about 25% of the melting point of a given metal, diffusion of the atoms at the surface and/or grain boundaries is enhanced. The melting point of gold is 1064° C., thus as a gold film is heated above 266° C. (25% of its melting point), diffusion of gold atoms at the surface and/or grain boundaries is enhanced, leading to grain growth and associated morphological changes in the film. However, as the melting point of W is 3422° C. movement of W atoms may not be observed until at least about 855° C. Thus, while the gold atoms may gain mobility at 266° C., the W atoms will not. Accordingly, as the W atoms surround the gold grain boundaries, the W particles may effectively lock the gold grains in place at high temperatures where gold is typically mobile (e.g. at temperatures near 266° C. and higher) and thus inhibit gold grain growth.

As noted previously, the Au—X alloys disclosed herein are suitable as a plasmonic material. Plasmonic properties may be evidenced by the wavelength dependent optical constants: n and k. The index of refraction, n, of a given medium describes how light propagates through that medium, and is given by the equation: n=c/v, where c is the speed of light in a vacuum and v is the speed of light in the medium. When light travels through a medium, a portion of the light will typically be absorbed. Thus, for metals and other opaque materials that absorb and refract light, the index of refraction is typically defined by the complex index of refraction, ñ, with the real part accounting for refraction and the imaginary part accounting for absorption. Particularly, the complex index of refraction is expressed as: ñ=n+ik, where n is the real part of the refractive index, and k is the absorption coefficient referring to the amount of absorption loss when light propagates through a medium. Where k is greater than zero, radiation is typically absorbed; whereas k=0 indicates that the radiation travels without loss. In some approaches, a combined heat sink and plasmonic underlayer comprising the Au—X alloys disclosed herein may thus be characterized as having optical constants (n,k) that are suitable and advantageous for the wavelengths typically used in HAMR recording, e.g. wavelengths between about 700 nm and 900 nm, preferably wavelengths near or equal to about 830 nm.

In more approaches a combined heat sink and plasmonic underlayer comprising the Au—X alloys disclosed herein may be characterized as having (n,k) optical constants at wavelengths between about 700 nm and 900 nm that are about equal to the (n,k) optical constants of an otherwise pure gold underlayer film. Pure gold is suitable as a plasmonic material for wavelengths between about 700 nm and 900 nm, however, a pure gold underlayer may be soft and mobile, leading to an enhanced film roughness that is disadvantageous for HDD technology. It has been surprising and unexpectedly found in particular approaches, that addition of a small amount of one or more immiscible alloying components in Au, such as Rh, Mo, W, Pt, Ru, Co, B and Ni, not only greatly improves the thermal stability, but also leaves substantially unaltered the advantageous plasmonic (e.g. optical) properties typically associated with pure gold.

For instance, in one approach, a combined heat sink and plasmonic underlayer comprising Au—Ni, where Ni is present in an amount greater than zero and less than or equal to about 2 at %, may have a refractive index, n, at 830 nm of about 0.3, which is only slightly higher than the "n" of 0.2 for pure Au. Similarly, the absorption coefficient, k, at about 830 nm for Au-2% Ni is about 5.47, which is only a slight increase from the "k" of 5.4 for pure Au. In another approach, a combined heat sink and plasmonic underlayer comprising Au—Rh, where Rh is present in an amount greater than zero and less than or equal to about 2 at %, may have a refractive index, n, and an absorption coefficient, k, at about 830 nm that is about equal to 0.37 and 5.48, respectively, which are very similar to the "n" and "k" values at 830 nm for pure gold.

Moreover, another advantage associated the plasmonic underlayers comprising the Au—X alloys disclosed herein, is that the identity and/or amount of the alloying component X may be tuned/selected in order to tune the thermal conductivity, the thermal stability, the electrical conductivity, and/or the plasmonic properties associated with the plasmonic underlayer.

The physical and structural characteristics associated with the plasmonic underlayers comprising the Au—X alloys disclosed herein also offer additional advantages. For instance, the ease of growing <001> oriented fiber textured Au—X films, the cubic crystal structure of Au—X, and the lattice parameter of Au—X may allow for a continuous epitaxial crystal structure that starts at the plasmonic underlayer and progresses all the way through magnetic FePt layer, which is beneficial for HAMR media magnetic and structural properties.

Figure 8C:
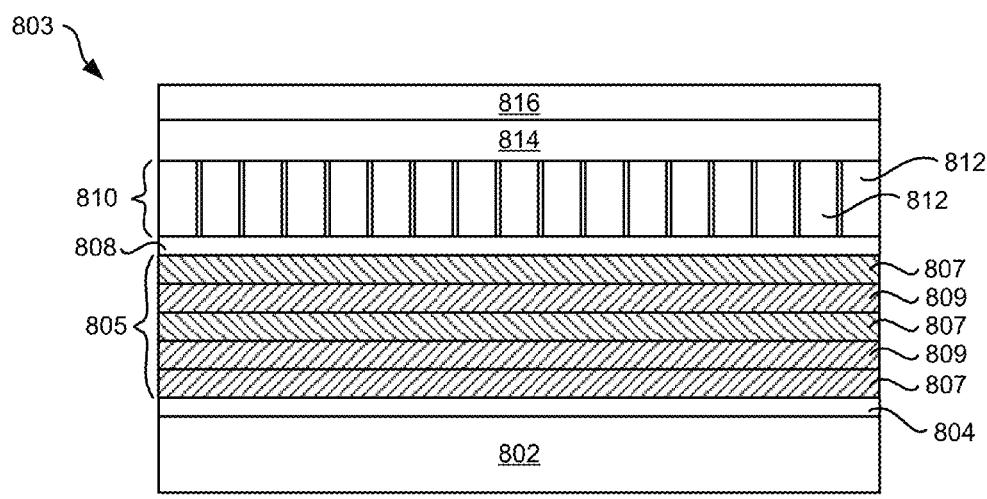
FIG. 8C is a partial cross-sectional view of a magnetic medium according to one embodiment

Referring now to FIGS. 8A-8C, magnetic media 800, 801, and 803 are shown according to different embodiments. As an option, the magnetic media 800, 801, and 803 may be implemented in conjunction with features from any other embodiment listed herein, such as those described with reference to the other FIGS. Of course, such a magnetic media 800, 801, and 803 and others presented herein may be used in various applications and/or in permutations which may or may not be specifically described in the illustrative embodiments listed herein. Further, the magnetic media 800, 801, and 803 presented herein may be used in any desired environment.

As shown in FIG. 8A, the magnetic medium 800 includes a substrate layer 802 comprising modern high temperature glass or other suitable material that allows media deposition at elevated temperatures, e.g., on the order of 400-800° C.

An adhesion layer 804 comprising NiTa and/or other suitable adhesion material is present above the substrate layer 802.

Above the adhesion layer 804, there is at least one plasmonic underlayer 806. The plasmonic underlayer 806 comprises an Au—X alloy, where X is an alloying component immiscible or substantially immiscible in Au. As used herein, the term "substantially immiscible" is intended to mean immiscible to the extent that two separate phases are formed.

In one embodiment, the alloying component X may have a melting point that is higher than the melting point of Au. In another embodiment, the alloying component X may comprise one or more metals that are immiscible in Au. In yet another embodiment, the alloying component X may be selected from a group consisting of: Rh, Mo, W, Co, Pt, Ru, B, Ni, and a combination thereof.

According to some approaches, X may be Rh present in an amount from about 0.5 at % to about 8 at %. According to other approaches, X may be Ni present in an amount from about 0.5 at % to about 25 at %. According to more approaches, X may be W present in an amount from about 0.5 at % to about 8 at %. According to additional approaches, X may be Mo present in an amount from about 0.5 at % to about 8 at %.

In a further embodiment, the plasmonic underlayer 806 including the Au—X alloys disclosed herein may be thermally stable at high temperatures, such as those temperatures typically used during HAMR media fabrication, e.g. temperatures ranging from between about 400° C. and 800° C. The alloying component X may substantially surround the gold grain boundaries, effectively "looking" the gold grains and thereby preventing aggressive gold grain growth at these high temperatures, in various approaches. Accordingly, the plasmonic underlayer 806 may be characterized as having negligible to no separation of the alloying components at grain boundaries at such high temperatures.

The thermal stability of the plasmonic underlayer 806 may be evidenced by measuring the surface roughness of said underlayer. For instance, the plasmonic underlayer 806 may have a surface roughness of less than about 1 nm, in some approaches. It has been surprisingly and unexpectedly found that this surface roughness of less than about 1 nm may persist even after the plasmonic underlayer 806 is annealed for about 15 hours at temperatures up to about 400° C.

Also contributing to the thermal stability of the plasmonic underlayer 806 is the negligible miscibility of the alloying component X in Au. Stated another way, as the alloying component X is substantially immiscible in Au, there will be no precipitation of Au—X secondary phases at higher temperatures, e.g. during annealing or HAMR related processes.

In an additional embodiments, the plasmonic underlayer 806 may have a high thermal conductivity. For example, in some approaches, the plasmonic underlayer 806 may have a thermal conductivity of at least 30 W/m-K.

According to more embodiments, the identity and/or amount of the alloying component X in the Au—X alloy of the plasmonic underlayer 806 may be selected/tuned in order to achieve a desired thermal stability and/or thermal conductivity. For example, in one approach, a plasmonic underlayer including Au—Rh, with Rh present in an amount greater than zero and less than or equal to about 1.2 at %, may have a thermal conductivity of at least about 100 W/m-k. In another approach, a plasmonic underlayer including Au—Ni, with Ni present in an amount greater than zero and less than or equal to about 3.8 at % or less, may have a thermal conductivity of at least about 100 W/m-k.

According to yet another embodiment, the plasmonic underlayer 806 including the Au—X alloys disclosed herein may have plasmonic properties, e.g. optical properties, advantageous to HAMR recording. In particular approaches, the plasmonic underlayer 806 may exhibit optical properties at wavelengths typically used to heat HAMR media that are substantially similar to the optical properties of an otherwise identical underlayer comprising pure gold nanoparticles. In other words, incorporation of the immiscible alloying component X in gold to form an Au—X alloy may only negligibly alter the optical properties associated with pure gold. See e.g. FIGS. 15A-15B and 16A-16B.

With regard to specific optical properties, the plasmonic underlayer 806 including an Au—X alloy may be characterized as having an index of refraction (n) and an absorption coefficient (k) that are suitable and advantageous at the wavelengths used in HAMR recording, preferably at wavelengths near or equal to 830 nm. According to more embodiments, the identity and/or amount of the alloying component X in the Au—X alloy may be selected/tuned in order to achieve desired optical properties of the plasmonic underlayer 806, such as a desired refractive index and/or absorption coefficient.

Referring now to FIG. 8B, the magnetic medium 801 may include two or more plasmonic underlayers 806, 806b, according to one embodiment. It should be noted that the magnetic medium 801 illustrates a variation of the magnetic medium 800 shown FIG. 8A. Accordingly, various components of FIG. 8B have common numbering with those of FIG. 8A.

In one approach, the plasmonic underlayer 806 and/or the plasmonic underlayer 806b may have a thickness between about 10 nm to about 100 nm. In another approach, the combined thickness of the plasmonic underlayer 806 and the plasmonic underlayer 806b may be less than or equal to about 100 nm. In various approaches, the thickness of the plasmonic underlayers 806 and 806b may be the same or different.

In numerous approaches, the plasmonic underlayer 806 of FIG. 8B, may include an Au—X alloy, where X is an alloying component immiscible or substantially immiscible in Au, and the plasmonic underlayer 806b may include an Au—Z alloy, where Z is an alloying component immiscible or substantially immiscible in Au. In some approaches, the alloying components X and Z may be independently selected from a group consisting of: Rh, Mo, W, Co, Pt, Ru, B, Ni, and a combination thereof. In more approaches, X and Z are different immiscible alloying components. For example, in one such approach, one of the plasmonic underlayers may include Au—Rh, whereas the other plasmonic underlayer may include Au—Ni. Again it is important to note that the alloying components X and Z may each include one or more elements, one or more metals, one or more compounds, etc. For instance, X may include one or more immiscible metals and Z may include one or more immiscible metals, where some or all of the one or more immiscible metals associated with X may be the same or different as some or all of the one or more immiscible metals associated with Z.

In preferred approaches, the two plasmonic underlayers 806, 806b may be complementary such that the optical, thermal and/or electrical properties of one plasmonic underlayer are not hindered by the respective properties of the other plasmonic underlayer. In various approaches, the magnetic medium 801 including the two plasmonic underlayers 806, 806b may exhibit optical, thermal and/or electrical properties that are substantially the same or enhanced (e.g. improved for HAMR recording purposes) as compared to a magnetic medium having only one of the plasmonic underlayers. For instance, improved thermal properties for HAMR recording may include increased thermal conductivity and/or increased thermal stability; improved optical properties, such as an index of refraction and/or absorption coefficient at wavelengths suitable for HAMR recording, e.g. about 830 nm, that more closely approach the n,k optical properties of pure gold, etc.

It is important to note that that the magnetic mediums disclosed herein are not limited to one or two plasmonic underlayers. For example, in additional approaches, a magnetic medium may include a multilayered plasmonic underlayer comprising two or more plasmonic underlayers, where each layer in the multilayered plasmonic underlayer comprises a gold alloy that has one or more alloying components substantially immiscible or immiscible in gold. In some approaches, each layer may comprise a different gold alloy. For instance, the gold alloys may be different by virtue of having different alloying components. In other words, some or all of the alloying components in the gold alloy of each layer may be different from some or all of the alloying components in the gold alloys of the other layers. In such approaches, the one or more alloying components in each gold alloy layer may be independently selected from a group consisting of: Rh, Mo, W, Co, Pt, Ru, B, Ni, and a combination thereof. However, in other approaches, each layer may comprises the same gold alloy, meaning that each gold alloy has the same alloying elements.

In approaches where a magnetic medium includes one or more plasmonic underlayers, the combined thickness of all the plasmonic underlayers may be between about 10 nm to about 100 nm.

Referring now to FIG. 8C, a magnetic medium 803 may include a multilayered plasmonic underlayer 805, according to yet another embodiment. It should be noted that the magnetic medium 805 illustrates a variation of the magnetic medium 800 shown FIG. 8A. Accordingly, various components of FIG. 8C have common numbering with those of FIG. 8A.

As shown in FIG. 8C, the multilayered plasmonic underlayer 805 includes alternating plasmonic underlayers 807 and 809. In one embodiment, one of the alternating layers comprises pure gold, while the other alternating layer comprises a gold alloy that has one or more alloying components substantially immiscible or immiscible in Au. For instance, the plasmonic underlayer 807 may be pure gold and the plasmonic underlayer 809 may comprise the gold alloy, or vice versa. In some approaches, the gold alloys in the alternating gold alloy layers may be the same or different. Accordingly, the one or more alloying components in each gold alloy layer may be independently selected from a group consisting of: Rh, Mo, W, Co, Pt, Ru, B, Ni, and a combination thereof.

Other configurations of the multilayered plasmonic underlayer 805 are also possible. For example, in another embodiment, the plasmonic underlayer 807 may be pure gold and the plasmonic underlayer 809 may itself comprise one, two, three, four, or more gold alloy layers, where each of the gold alloy layers includes alloying components that are substantially immiscible or immiscible in gold. In yet another embodiment, the plasmonic underlayer 807 may comprise two or more layers of pure gold, and the plasmonic underlayer 809 may comprises one or more gold alloy layers, where each of the gold alloy layers includes alloying components that are substantially immiscible or immiscible in gold.

In further embodiments, the total thickness of the multi-layered plasmonic underlayer 805 may be between about 10 nm to about 100 nm.

According to yet more approaches, the magnetic mediums 800, 801 and 803 of FIGS. 8A, 8B, and 8C, respectively, may include one or more heat sink layers in addition to the plasmonic underlayers disclosed herein.

With continued reference to FIGS. 8A, 8B and 8C, the magnetic medium 800 includes a seed layer 808 above the plasmonic underlayer 806. The seed layer 808 may act as a texture defining layer to influence the epitaxial growth (e.g. the granularity and texture) of the magnetic recording layer 810 formed there above. In some approaches, the seed layer 808 may comprise MgO or other such suitable material known in art.

As shown in FIGS. 8A, 8B and 8C, the magnetic recording layer 810 has a plurality of granular magnetic grains 812, which are preferably characterized by a columnar shape. In one approach, the magnetic grains 812 of the magnetic recording layer 810 may include FePt. In another approach, the magnetic grains 812 of the magnetic recording layer 810 may include FePt—X, where X may include one or more of Ag, Cu, Au, Ni, Mn, etc. In yet another approach, the magnetic grains 812 of the magnetic recording layer 810 may include FePtX—Y, where X may include one or more of Ag, Cu, Au, Ni, Mn, etc., and Y may include one or more of C, $SiO_2$, $TiO_2$, BN, CrOx etc. While not shown in FIGS. 8A, 8B and 8C, the magnetic grains 812 may be separated by a segregant. The segregant preferably contributes to the columnar structure of the magnetic grains 812, in addition to the magnetic properties of the magnetic medium 800 as a whole. Thus, the segregant may include similar materials including, but not limited to C, $SiO_2$, $TiO_2$, $TaO_x$, SiC, SiN, TiC, TiN, BN, BC, $Cr_2O_3$, CrN, etc.

The magnetic medium 800 may also include two or more magnetic recording layers (not shown in FIGS. 8A, 8B and 8C). When two or more magnetic recording layers are present, the magnetic grains 812 preferably extend through each of the magnetic recording layers. Additionally, when two or more magnetic recording layers are present, the magnetic grains 812 in each magnetic recording layer may be separated by a segregant. The segregants in each of the magnetic recording layers may be the same or different from one another.

The magnetic medium 800 shown in FIGS. 8A, 8B and 8C, also includes an overcoat 814, e.g. a carbonaceous overcoat, above the magnetic recording layer 810. A high temperature lubricant 816 is also present above the overcoat 814. In preferred approaches, both the overcoat 814 and the lubricant 816 are thermally stable at the high temperatures encountered during the recording process.

The layers present in the magnetic medium 800 of FIGS. 8A, 8B and 8C may be formed using a sputtering deposition process in various approaches. Layers of the magnetic medium 800 that may include a composite composition may be formed via sputtering from the same target (e.g. a target including the composite composition) in one approach, or via sputtering from different respective targets (e.g. different targets, each of which include a single material present in the composite composition) in another approach. In approaches where a layer is formed via sputtering from different targets, it is preferable that the materials from the different targets are deposited onto the magnetic medium 800 at the same time. For example, the magnetic grain and segregant materials of the magnetic recording layer 808 are preferably deposited onto the magnetic medium 800 at the same time, in a heated environment, e.g., from about 400° C. degrees to about 800° C.

In additional embodiments, the magnetic medium 800 shown in FIGS. 8A, 8B and 8C, as well as other magnetic media disclosed herein, may be a component of a magnetic data storage system. Such a magnetic data storage may also include at least one magnetic head, a drive mechanism for passing the magnetic medium over the at least one magnetic head, and a controller electrically coupled to the at least one magnetic head for controlling operation of the at least one magnetic head, in some approaches. The at least one magnetic head may include a near field transducer (NFT), an optical waveguide configured to illuminate the NFT, and a write pole, in more approaches.

EXAMPLES

Several embodiments of specific Au—X alloys are presented below to highlight the surprising thermal and optical properties exhibited by such alloys. It is important to note that the examples provided herein are not meant to be limiting in any way, and solely provide illustrative embodiments of the present invention.

Thermal Conductivity

Figure 9:
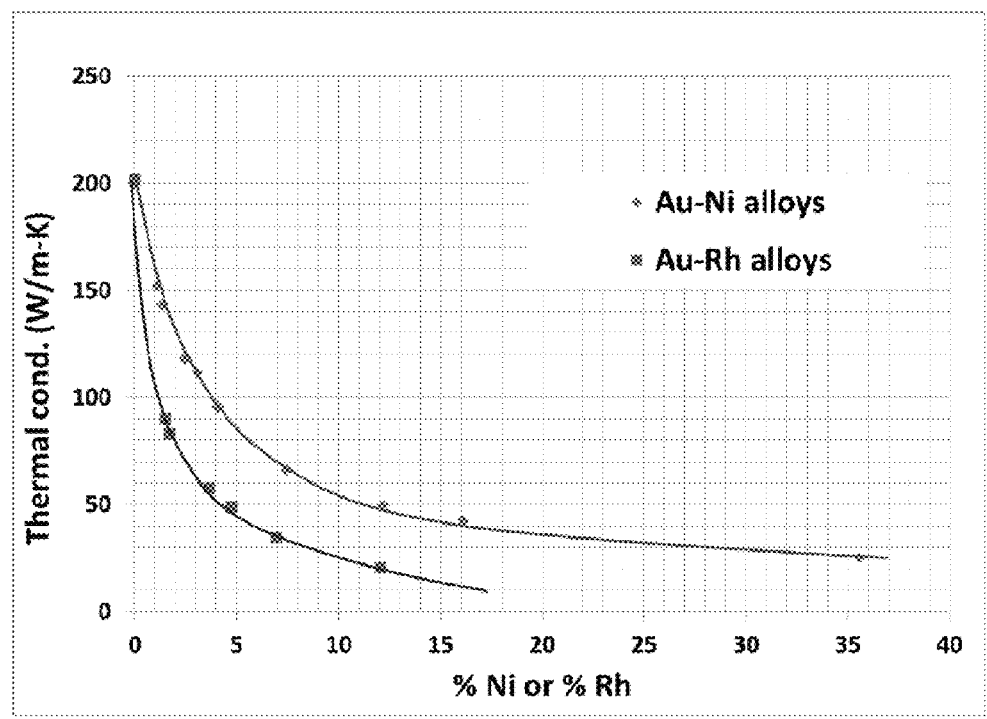
FIG. 9 is a plot of the thermal conductivities of Au—Ni and Au—Rh alloys.

A plasmonic underlayer comprising the Au—X alloys disclosed herein have a greatly improved thermal conductivity as compared to conventional heat sink underlayers used in HAMR media. Reference is made, for example, to FIG. 9, which illustrates a plot of the thermal conductivities of Au—Ni and Au—Rh alloys.

As shown in FIG. 9 for the Au—Rh alloys, in approaches where the Rh is present in an amount greater than zero and less than or equal to about 8 at %, the plasmonic underlayer may have a thermal conductivity of at least 30 W/m-K. In other approaches where the Rh is present in an amount greater than zero and less than or equal to about 1.2 at %, the plasmonic underlayer may have a thermal conductivity of at least 100 W/m-K.

As also shown in FIG. 9 for the Au—Ni alloys, in approaches where the Ni is present in an amount greater than zero and less than or equal to about 25 at %, the plasmonic underlayer may have a thermal conductivity of at least 30 W/m-K. In more approaches where the Ni is present in an amount greater than zero and less than or equal to about 3.8 at %, the plasmonic underlayer may have a thermal conductivity of at least 100 W/m-K.

For comparison purposes, the thermal conductivity of a heat sink layer comprising of pure transition metals (e.g. Ta, V, Ti, Cr) or alloys remains significantly lower than 100 W/m-K. However, as shown in FIG. 9, the thermal conductivity of a plasmonic layer comprising an Au—Rh alloy or Au—Ni alloy may be tuned/selected by tuning/selecting the amount of the alloying component (i.e. Rh or Ni) relative to Au.

It is important to note that the Au—X alloys disclosed herein are not limited to Au—Rh alloys or Au—Ni alloys. While FIG. 9 illustrates the high thermal conductivity of Au—Rh and Au—Ni alloys, other Au—X alloys disclosed herein (e.g. Au—W, Au—Mo, etc.) also have similar high thermal conductivities.

Thermal Stability

A plasmonic underlayer comprising the Au—X alloys disclosed herein not only have a greatly improved thermal conductivity as compared to conventional heat sink underlayers used in HAMR media, but also a greatly improved thermal stability. This advantageous thermal stability may be observed by comparing the grain size evolution of sputtered Au films and sputtered Au—Rh films containing about 1.75 at % Rh at different annealing temperatures. For stance, FIGS. 10A-10D provide SEM images of a sputtered Au film after 15 hours of annealing at different temperatures, e.g. 100° C.-400° C. The progression from FIG. 10A to FIG. 10D illustrates that annealing the Au films at progressively high temperatures yields observable grain growth.

FIGS. 11A-11D provide SEM images of the sputtered Au—Rh films containing about 1.75 at % Rh after 15 hours of annealing at different temperatures, e.g. 100° C.-400° C. As evidenced by the progression from FIG. 11A to FIG. 11D, annealing the Au—Rh films at progressively higher temperatures yields negligible to no separation of the alloying components, as well as negligible to no grain growth. Moreover, even after annealing the Au—Rh films at high temperatures, e.g. 400° C., the surface roughness of the Au—Rh films remains below 1 nm.

Figure 12:
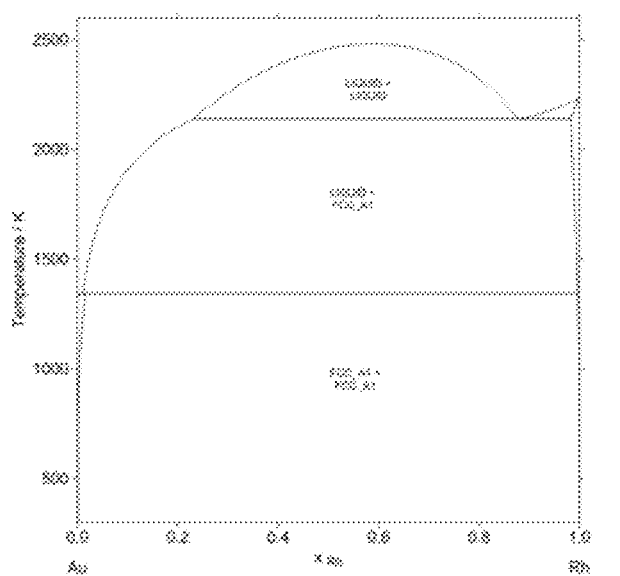
FIG. 12 is an Au—Rh binary phase diagram.

Without wishing to be bound by a particular theory, the enhanced thermal stability associated with the above Au—Rh films may arise due to the negligible or minimal miscibility of Rh in Au, which is evident from the Au—Rh phase diagram shown in FIG. 12. The immiscibility of Rh in Au prevents the formation of secondary phases during annealing.

Figure 13:
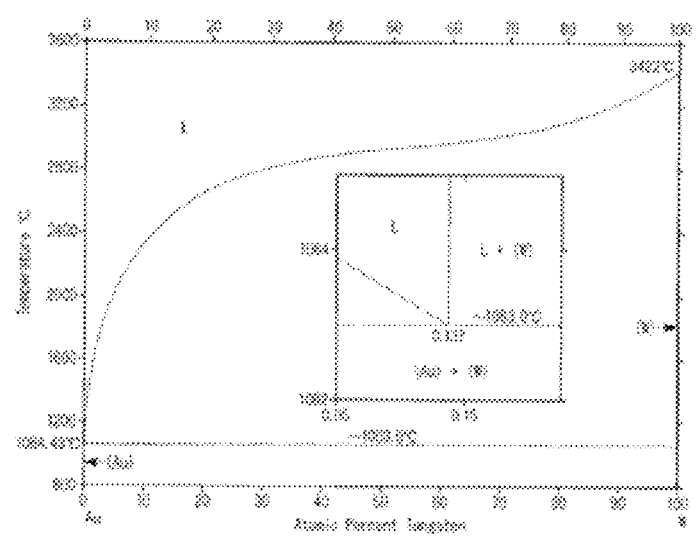
FIG. 13 is an Au—W binary phase diagram.
Figure 14:
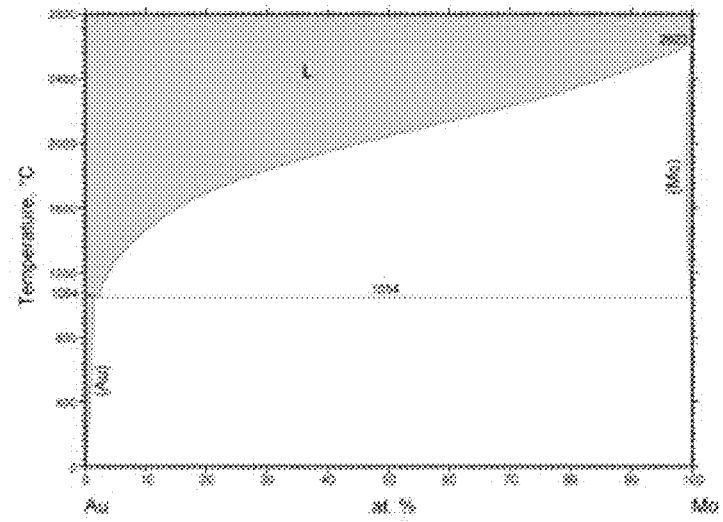
FIG. 14 is an Au—Mo binary phase diagram.

Again, it is important to note that the Au—X alloys disclosed herein are not limited to Au—Rh alloys or Au—Ni alloys. While FIGS. 11A-11D and 12 illustrate the high thermal stability of Au—Rh alloys, other Au—X alloys disclosed herein (e.g. Au—Ni, Au—W, Au—Mo, etc.) are also thermally stable at high temperatures. For instance, the alloying components Ni, W, Co, Pt, Ru, B and Mo are also substantially immiscible in Au and therefore will not form secondary phases during annealing at high temperatures. See e.g. the Au—W and Au—Mo phase diagrams of FIGS. 13 and 14, respectively.

Further, it should be noted that the results achieved herein were both surprising and unexpected, and could not have been predicted. As discussed previously, the thermal stability of the Au—X alloys disclosed herein, where X is an alloying component substantially immiscible in Au (e.g. Rh, Ni W, Co, Pt, Ru, B, Mo), was not expected or predictable given that immiscible materials typically form separate phases/grains, and therefore do not prevent grain growth at grain boundaries. In contrast, it has been surprisingly and unexpectedly found that for the disclosed Au—X alloys, the immiscible alloying component X surrounds the gold grain boundaries. Thus, in preferred approaches where the immiscible alloying component X has a melting point that is greater than the melting point of gold and surrounds the gold grain boundaries, the immiscible alloying component X appears to effectively "lock" the gold grains in place, thereby preventing aggressive grain growth at high temperatures.

Plasmonic/Optical Properties

In addition to a high thermal conductivity and thermal stability, a plasmonic underlayer comprising the Au—X alloys disclosed herein has optical properties (e.g. optical constant n,k) that are suitable and advantageous for the wavelengths typically used in HAMR recording, e.g. wavelengths between about 700 nm and 900 nm. These advantageous optical properties may be measured/quantified in some approaches by analysis of the (n,k) optical constants associated with the Au—X alloys disclosed herein.

Figure 15A:
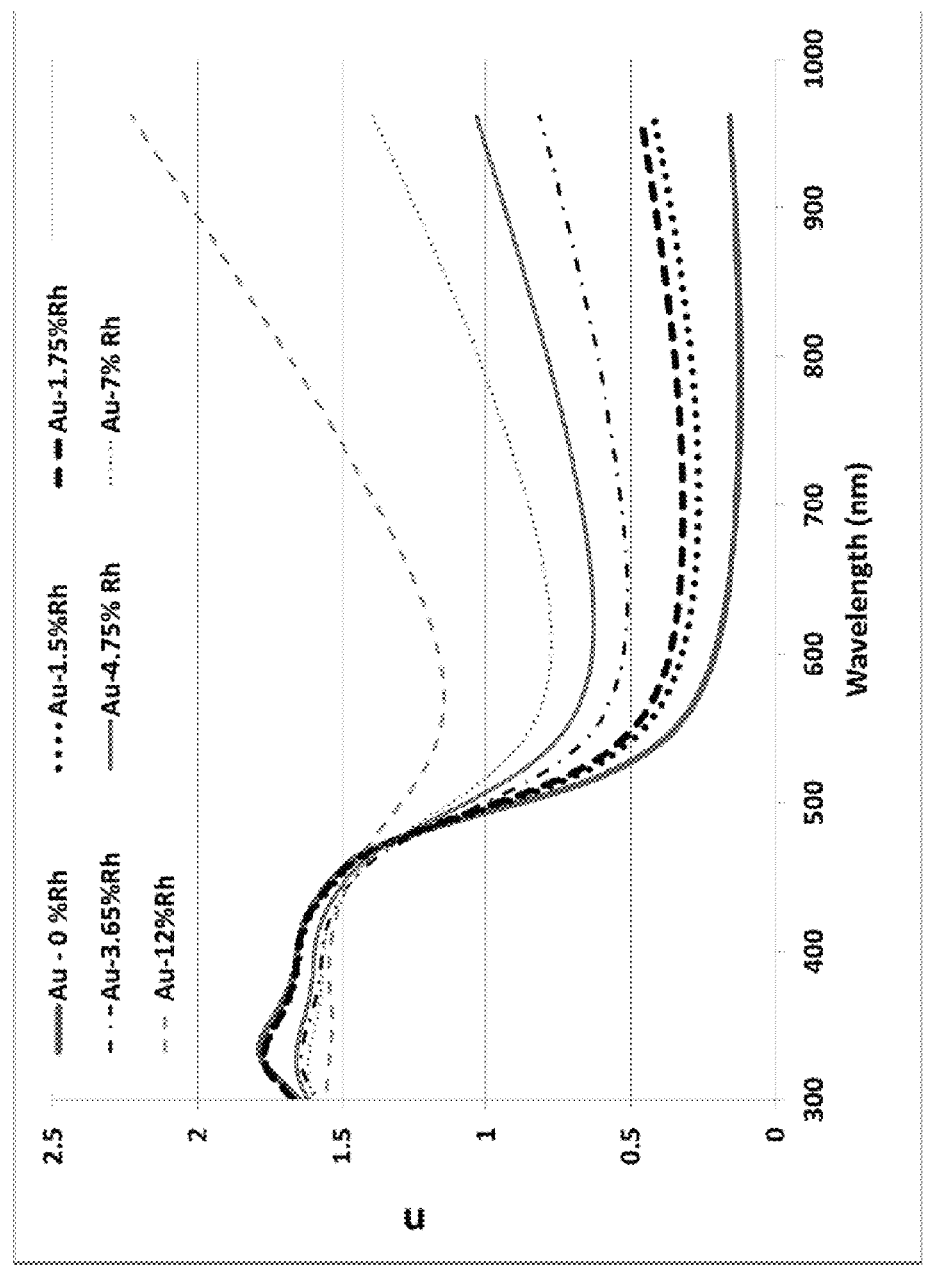
FIG. 15A is a plot of refractive index (n) versus wavelength for Au and Au—Rh films.
Figure 15B:
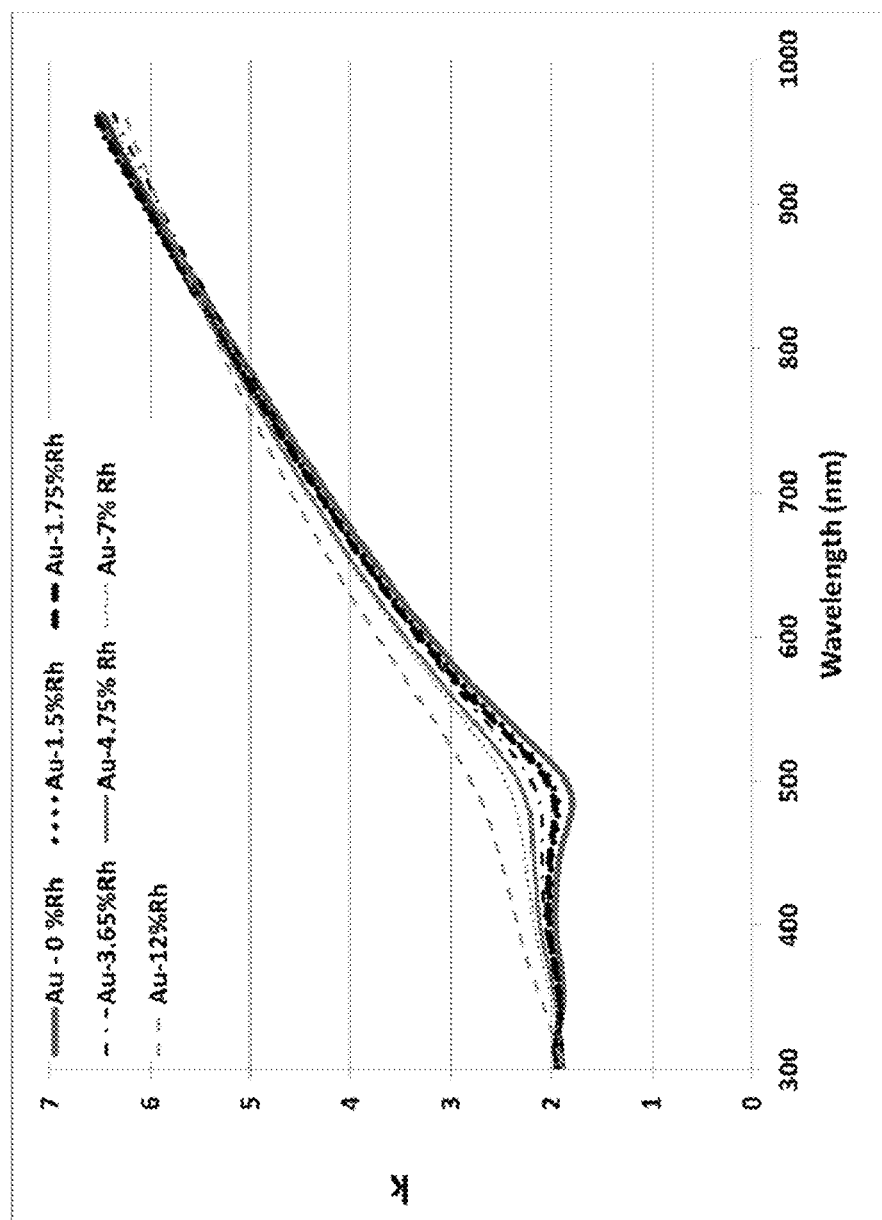
FIG. 15B is a plot of the absorption coefficient (k) versus wavelength for Au and Au—Rh films shown in FIG. 15A.

FIG. 15A illustrates a plots of the refractive index, n, versus wavelength for a sputtered Au film and various Au—Rh films comprising different amounts of Rh. FIG. 15B illustrates a plots of the absorption coefficient, k, versus wavelength for a sputtered Au film and various Au—Rh films comprising different amounts of Rh. As shown in FIGS. 15A-15B, addition of a small amount of Rh, e.g. up to about 4 at %, does not substantially alter the (n,k) optical constants typically associated with pure gold. Pure gold is a suitable plasmonic material for wavelengths in the range of about 700 nm to 900 nm. Thus, as Au—Rh alloys comprising Rh in an amount greater than 0 to less than or equal to about 4 at % have (n,k) optical constants similar to gold at, e.g. about 830 nm, said Au—Rh alloys are also suitable for use as plasmonic materials in HAMR media.

Figure 16A:
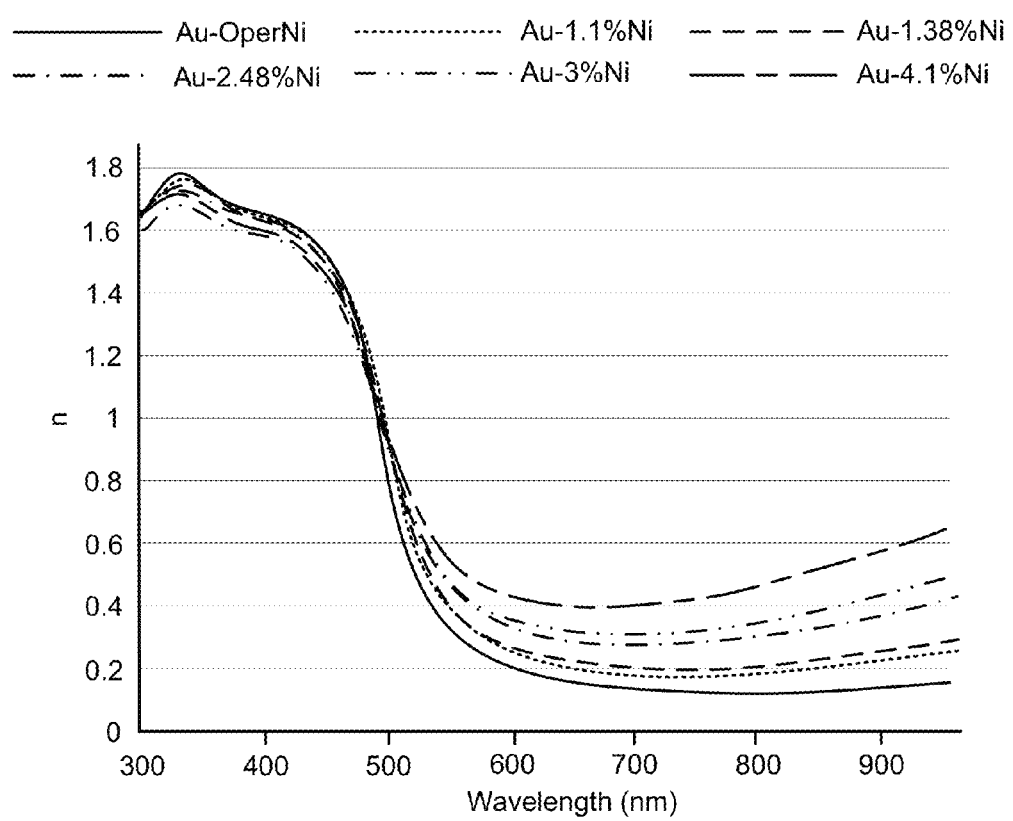
FIG. 16A is a plot of refractive index (n) versus wavelength for Au and Au—Ni films.
Figure 16B:
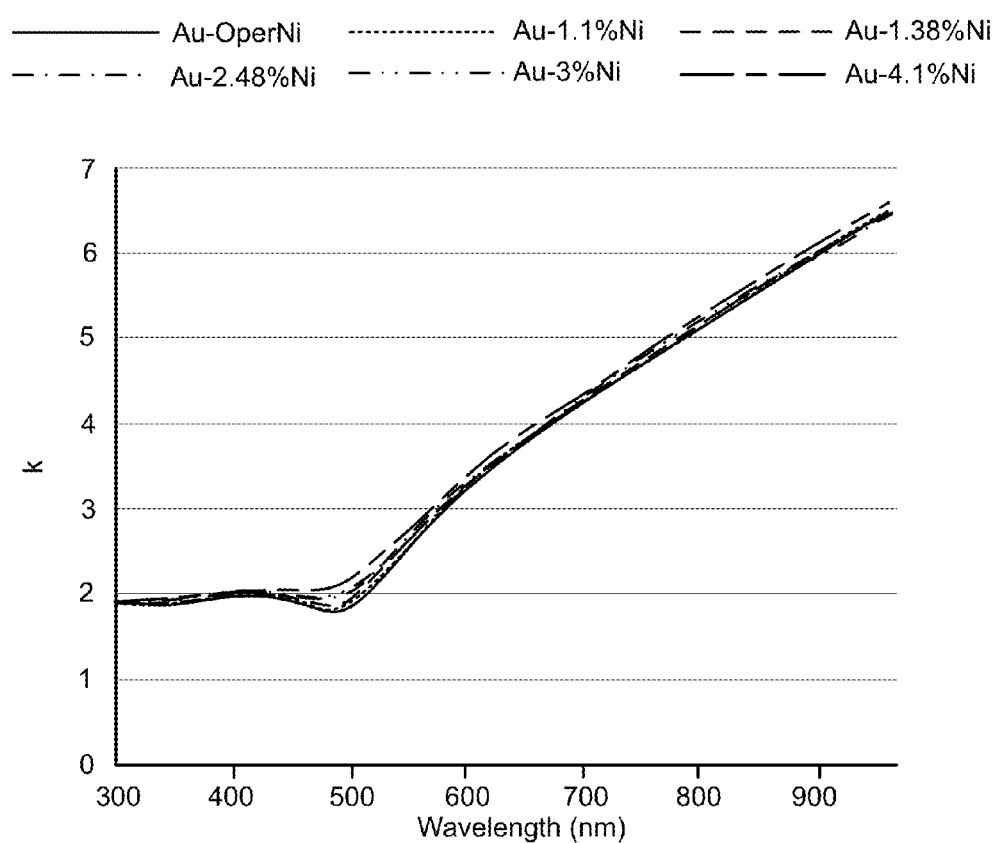
FIG. 16B is a plot of the absorption coefficient (k) versus wavelength for Au and Au—Ni films shown in FIG. 16A.

FIG. 16A illustrates a plots of the refractive index, n, versus wavelength for a sputtered Au film and various Au—Ni films comprising different amounts of Ni. FIG. 16B illustrates a plots of the absorption coefficient, k, versus wavelength for a sputtered Au film and various Au—Ni films comprising different amounts of Ni. As shown in FIGS. 16A-16B, addition of a small amount of Ni, e.g. up to about 4 at %, does not substantially alter the (n,k) optical constants typically associated with pure gold. Accordingly, in light of the (n,k) optical constants of the Au—Ni alloys comprising Ni in an amount greater than 0 to less than or equal to about 4 at %, said Au—Ni alloys are also suitable for use as plasmonic materials in HAMR media.

As also shown in FIGS. 15A-15B, and 16A-16B, the (n,k) optical constants of a plasmonic layer comprising an Au—Rh alloy or Au—Ni alloy may be tuned/selected by tuning/selecting the amount of the alloying component (i.e. Rh or Ni) relative to Au.

Additionally, it is important to note that the Au—X alloys disclosed herein are not limited to Au—Rh alloys or Au—Ni alloys. While FIGS. 15A-15B and 16A-16B illustrate the advantageous plasmonic/optical properties of Au—Rh an Au—Ni alloys, respectively, other Au—X alloys disclosed herein (e.g. Au—W, Au—Mo, etc.) also exhibit similar and advantageous optical properties (e.g. n,k constants) at wavelengths suitable for HAMR recording.

Further, it should again be noted that the results achieved herein were both surprising and unexpected, and could not have been predicted. For a given material, the plasmonic properties, as measured/defined by the n,k optical constants, generally vary with the crystallinity, composition, particle size, shape, dielectric constant, etc. of the material. Accordingly, the minimal change in optical performance between pure gold films and those comprising the thermally stable Au—X alloys disclosed herein was not predictable.

It should be noted that methodology presented herein for at least some of the various embodiments may be implemented, in whole or in part, in computer hardware, software, by hand, using specialty equipment, etc. and combinations thereof. Any of the methods, systems, products, etc. described above, taken individually or in combination, in whole or in part, may also be included in or used to make one or more products, processes, etc. In addition, any of the features presented herein may be combined in any combination to create various embodiments, any of which fall within the scope of the present invention.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic medium, comprising:
   a first plasmonic underlayer comprising a first Au alloy, wherein the first Au alloy comprises one or more alloying components that are substantially immiscible in Au;
   a second plasmonic underlayer comprising a second Au alloy, wherein the second Au alloy comprises one or more alloying components that are substantially immiscible in Au; and
   a magnetic recording layer above the plasmonic underlayers,
   wherein at least of one of the alloying components of the first Au alloy is different than at least one of the alloying components of the second Au alloy,
   wherein the first and second plasmonic underlayers each have a thermal conductivity of at least about 30 W/m-K.

2. The magnetic medium as recited in claim 1, wherein the one or more alloying components of the first Au alloy are selected from the group consisting of: Rh, Mo, W, Co, Pt, Ru, B and Ni.

3. The magnetic medium as recited in claim 1, wherein the one or more alloying components of the first Au alloy are inhomogeneously distributed within the first plasmonic underlayer.

4. The magnetic medium as recited in claim 1, wherein the one or more alloying components of the first Au alloy or the second Au alloy comprise Rh in an amount from about 0.5 at % to about 8 at %.

5. The magnetic medium as recited in claim 1, wherein the one or more alloying components of the first Au alloy or the second Au alloy comprise Ni in an amount from about 0.5 at % to about 25 at %.

6. The magnetic medium as recited in claim 1, wherein the one or more alloying components of the first Au alloy or the second Au alloy comprise W in an amount from about 0.5 at % to about 8 at %.

7. The magnetic medium as recited in claim 1, wherein the one or more alloying components of the first Au alloy or the second Au alloy comprise Mo in an amount from about 0.5 at % to about 8 at %.

8. A magnetic medium, comprising:
   a multilayered plasmonic underlayer; and
   a magnetic recording layer above the multilayered plasmonic underlayer,
   wherein the multilayered plasmonic underlayer comprises at least one plasmonic layer comprising a first Au alloy, and at least one plasmonic layer comprising a second Au alloy, wherein the first Au alloy is different than the second Au alloy.

9. The magnetic medium as recited in claim 1, wherein the one or more alloying components of the first Au alloy comprise Rh in an amount of about 1.2 at % or less, and wherein the first plasmonic underlayer has a thermal conductivity of about 100 W/m-K or greater.

10. The magnetic medium as recited in claim 1, wherein the one or more alloying components of the first Au alloy comprise Ni in an amount of about 3.8 at % or less, and wherein the first plasmonic underlayer has a thermal conductivity of about 100 W/m-K or greater.

11. The magnetic medium of claim 1, wherein the one or more alloying components of the second Au alloy are selected from the group consisting of: Rh, Mo, W, Co, Pt, Ru, B and Ni.

12. The magnetic medium as recited claim 1, wherein the one or more alloying components of the first Au alloy and the second Au alloy substantially surround Au grain boundaries.

13. The magnetic medium as recited claim 1, wherein the one or more alloying components of the first Au alloy and the second Au alloy have a melting point greater than the melting point of Au.

14. The magnetic medium as recited in claim 1, wherein a combined thickness of the first and second plasmonic underlayers is in a range from 10 nm to 100 nm.

15. A magnetic medium, comprising:
- a plasmonic underlayer comprising an Au alloy, wherein the Au alloy comprises one or more alloying components that are substantially immiscible in Au;
- a second plasmonic underlayer comprising a second gold alloy, wherein the second gold alloy comprises one or more alloying components that are substantially immiscible in Au; and
- a magnetic recording layer above the plasmonic underlayers,
- wherein the one or more alloying components in the second gold alloy are selected from a group consisting of: Rh, Mo, W, Co, Pt, Ru, B and Ni, with the proviso that the one or more alloying components of the second gold alloy are different than the one or more alloying components in the gold alloy.

16. The magnetic medium as recited in claim 1, wherein the first plasmonic underlayer and the second plasmonic underlayer each have a surface roughness of less than 1 nm.

17. The magnetic medium as recited in claim 1, wherein one of the plasmonic underlayers has a physical characteristic of being resistant to grain growth and morphological change at temperatures greater than about 100° C. to about 400° C.

18. The magnetic medium as recited in claim 8, wherein each plasmonic layer of the multilayered plasmonic underlayer has a thermal conductivity of at least about 30 W/m-K.

19. The magnetic medium of claim 8, wherein the first Au alloy and the second Au alloy each have one or more alloying components that are substantially immiscible in Au.

20. The magnetic medium as recited in claim 19, wherein the one or more alloying components in the first Au alloy and the second Au alloy are independently selected from the group consisting of: Rh, Mo, W, Co, Pt, Ru, B and Ni.

21. The magnetic medium as recited in claim 8, wherein the multilayered plasmonic underlayer comprises at least one plasmonic layer of pure gold.

22. The magnetic medium as recited in claim 21, wherein the plasmonic layer of pure gold is positioned between the plasmonic layer comprising the first Au alloy and the plasmonic layer comprising the second Au alloy.

23. The magnetic medium as recited in claim 8, wherein a total thickness of the multilayered plasmonic underlayer is between about 10 to about 100 nm.

24. A magnetic data storage system, comprising:
- at least one magnetic head,
- the magnetic medium as recited in claim 1;
- a drive mechanism for passing the magnetic medium over the at least one magnetic head; and
- a controller electrically coupled to the at least one magnetic head for controlling operation of the at least on magnetic head.

25. The magnetic data storage system as recited in claim 24, wherein the at least one magnetic head further comprises:
- a near field transducer;
- an optical waveguide configured to illuminate the near field transducer; and
- a write pole.

* * * * *

UNITED STATES PATENT AND TRADEMARK OFFICE
CERTIFICATE OF CORRECTION

PATENT NO. : 9,443,545 B2
APPLICATION NO. : 14/140408
DATED : September 13, 2016
INVENTOR(S) : Mosendz et al.

It is certified that error appears in the above-identified patent and that said Letters Patent is hereby corrected as shown below:

In the Specification

At Column 3, Line 6, please replace "scam" with --scan--;

At Column 5, Line 61, please replace "ultraviolet etc.)" with --ultraviolet light, etc.)--;

At Column 10, Line 28, please replace "present the" with --present in the--;

At Column 11, Line 10, please replace "temperatures about" with --temperatures $\geq$ about--;

At Column 13, Line 32, please replace "looking" with --locking--;

At Column 18, Line 4, please replace "For stance," with --For instance,--.

Signed and Sealed this
Thirteenth Day of March, 2018

Andrei Iancu
*Director of the United States Patent and Trademark Office*